United States Patent [19]

Fujioka

[11] Patent Number: 5,511,862
[45] Date of Patent: Apr. 30, 1996

[54] ANTI-LOCK BRAKE CONTROLLING APPARATUS

[75] Inventor: Hideaki Fujioka, Itami, Japan

[73] Assignee: Sumitomo Electric Industries, Ltd., Osaka, Japan

[21] Appl. No.: 214,554

[22] Filed: Mar. 18, 1994

[30] Foreign Application Priority Data

Apr. 7, 1993 [JP] Japan ..................................... 5-080674

[51] Int. Cl.$^6$ ....................................... B60T 8/00
[52] U.S. Cl. ......................... 303/113.4; 303/150; 303/171
[58] Field of Search ................................... 303/113.4, 94, 303/95, 100, 106, 102, 103, 109, 111, 164–166, 150, 155, 171; 188/181 A

[56] References Cited

U.S. PATENT DOCUMENTS

| 5,040,852 | 8/1991 | Takata ............................... 303/113.4 X |
| 5,230,549 | 7/1993 | Osada et al. ...................... 303/113.4 X |
| 5,242,216 | 9/1993 | Miyawaki et al. ....................... 303/106 |
| 5,249,848 | 10/1993 | Matsuto et al. .................. 303/113.4 X |

FOREIGN PATENT DOCUMENTS

| 3-167060 | 7/1991 | Japan .................................. 303/113.4 |
| 4-283155 | 10/1992 | Japan .................................. 303/113.4 |

Primary Examiner—David M. Mitchell
Assistant Examiner—Peter M. Poon
Attorney, Agent, or Firm—Greenblum & Bernstein

[57] ABSTRACT

A pedal stroke detector detects the degree of depression of a brake pedal of a master cylinder to determine a road surface friction coefficient. A wheel speed detector monitors the speed of each wheel of a vehicle. A vehicle body speed calculator estimates the vehicle speed from the wheel speed of each wheel and the degree of depression of the brake pedal as detected by the pedal stroke detector. A lock symptom detecting mechanism detects a lock symptom from the estimated vehicle body speed and wheel speed. When a lock symptom is detected, a memory stores the degree of depression. Subsequent movement calculations are based on the larger of the degree of depression for the instant operational cycle and the degree of depression stored in memory.

17 Claims, 25 Drawing Sheets

*Fig.9*

42' $(-)\Delta WREF_i = -C_1 \cdot g - \dfrac{STR}{C_2} \times C_3$
(MIN. $C_4$)

191  $(-)\Delta WREF_i = -1.25g$

192 $SKDTMR_i \geqq 128$

194
$$C_5 = 3 + \frac{MAX(STR, STRE_0 \sim STRE_3)}{16}$$
$$C_6 = -\frac{MAX(STR, STRE_0 \sim STRE_3)}{80}$$
$$C_7 = 5 + \frac{MAX(STR, STRE_0 \sim STRE_3)}{16}$$

193
$$C_5 = 6 + \frac{MAX(STR, STRE_0 \sim STRE_3)}{32}$$
$$C_6 = -\frac{MAX(STR, STRE_0 \sim STRE_3)}{80}$$
$$C_7 = 5 + \frac{MAX(STR, STRE_0 \sim STRE_3)}{16}$$

ANTI-LOCK BRAKE CONTROLLING APPARATUS

BACKGROUND OF THE INVENTION

The present invention generally relates to an anti-lock brake controlling apparatus, and more particularly, to an anti-lock controlling apparatus, provided with a pedal stroke quantity detecting means for detecting a stepping quantity of a brake pedal which detects a road surface friction coefficient (road face μ), where the stepping quantity of a brake pedal detected by the pedal stroke quantity detecting means is one of several factors in a control operation.

An anti-lock brake controlling apparatus is adapted to detect a reduction in a wheel speed with respect to an estimated vehicle body speed, a skid situation of a wheel from speed changes of the wheel, and prevent locks by changing a wheel cylinder fluid pressure, thus shortening a braking distance, and ensuring stability and steerability.

The above described anti-lock controlling apparatus requires that friction coefficients on road surfaces on which a vehicle runs be determined correctly so as to effect a more suitable controlling operation.

It is preferable to consider the road surface friction coefficients to estimate the vehicle body speed, because the vehicle body speed is subject to influence from the road surface friction coefficients.

Generation of a lock symptom is also subject to influence from the road surface friction coefficients. On a high μ road surface where friction coefficients are high on the road surface (asphalt or the like), the lock symptoms are difficult to cause on wheels even if the wheel cylinder fluid pressure increase. On a low μ road surface where friction coefficients are low on the road surface (snow covered road, ice covered road or the like), lock symptoms occur even when the wheel cylinder fluid pressure is relatively low.

The road surface friction coefficients relate to a period of reduction time of a wheel cylinder fluid pressure in the anti-lock controlling operation. When the pressure of the wheel cylinder fluid is reduced by the switching operation of a so-called on/off type solenoid valve in the above described anti-lock brake controlling apparatus, a pressure reducing characteristic is in approximate exponential relation with respect to the opened time of the solenoid valve as shown in FIG. 28. In a case where the pressure is reduced from the P1,a of relatively high pressure, and in a case where the pressure is reduced from P2 (which corresponds to low μ road surface) lower in pressure than the P1 (which corresponds to high μ road surface), the reduction pressure width ΔP1 is larger than the reduction pressure width ΔP2. Therefore, a stop distance is longer because of excessive reduction pressure when the pressure reduction time in the anti-lock controlling operation has been set excessively, in spite of high μ road surface. If the pressure reducing time is set short in spite of the low μ road surface, the risk of a so-called cascade lock, where the four wheels of an automobile are directed at locking, is increased due to insufficient pressure reduction.

On the other hand, an anti-lock brake controlling apparatus for estimating the road surface μ from the changes in speed of the vehicle body, and an anti-lock brake controlling apparatus provided with a sensor for directly measuring the road surface μ are provided.

An anti-lock brake control apparatus of a type which estimates the road surface μ from the changing speeds of the above described vehicle body judges that the road surface which is low μ is a high μ road surface when the wheel speed of all four wheels once starts reducing at a time, and becomes insufficient in pressure reproduction, thus having a risk of further increasing a tendency of cascade lock.

A sensor for directly detecting the above described road surface μ is expensive, thus increasing a manufacturing cost.

SUMMARY OF THE INVENTION

Accordingly, the present invention has been developed with a view to substantially eliminate the above discussed drawbacks inherent in the prior art, and has for its essential object to provide an improved anti-lock controlling apparatus at a lower cost.

Another important object of the present invention is to provide an improved anti-lock controlling apparatus which can precisely estimate the road surface μ and preferably control by making the estimate road surface μ one of the controlling factors.

In accomplishing these and other objects, according to one preferred embodiment of the present invention, there is provided an anti-lock brake controlling apparatus which includes a master cylinder for feeding an operation fluid onto a wheel cylinder side in accordance with the stepping quantity of the brake pedal, and a fluid pressure controlling valve for controlling the fluid pressure of the above described wheel cylinder, and which is characterized in that there is provided a pedal stroke quantity detecting means for detecting the stepping quantity of the above described brake pedal for detecting the friction coefficient of the road surface so as to set a signal for driving the above described fluid pressure controlling valve in accordance with, at least, a signal from the above described pedal stroke quantity detecting means.

Concretely, the present invention comprises a wheel speed detecting means for detecting the speed of each wheel of a vehicle, a wheel movement calculating means for calculating the wheel movements including at least a wheel speed in accordance with a signal from the wheel speed detecting means, an estimating vehicle body speed calculating means for calculating the estimated vehicle body speed in a position of each wheel in accordance with the wheel movements calculated by the above described wheel movements calculating means and a stepping quantity of a brake pedal detected by the above described pedal stroke quantity detecting means.

It is preferable that the above described estimated vehicle body speed calculating means is adapted to set to increase the maximum descent speed of the above described estimated vehicle body speed in accordance with the increase of the stepping quantity to be detected by the above described pedal stroke quantity detecting means.

Further, it is preferable that the above described estimated vehicle body calculating means is adapted to increase the maximum descent speed of the estimated vehicle body speed corresponding to a wheel to be positioned on the road surface where a road surface friction coefficient is larger in accordance with the increase in the stepping quantity to be detected by the above described pedal stroke quantity detecting means when the friction coefficients of the road surface where the vehicle is running is different on the right-hand side and left-hand side, and to set it to a value greater than the maximum descent speed at the uniform road surface time.

Further, it is preferable that the above described estimated vehicle body speed calculating means is adapted to increase in accordance with the increase in the stepping quantity detected by the above decreased pedal stroke quantity detecting means, the maximum descent speed of the estimated vehicle body speed corresponding to the wheel position on the external side of the turning radius when the vehicle is turning on a corner, and to set it to a value greater than the maximum descent speed at a straight line operation time.

Further, the above described estimated vehicle body speed calculating means is adapted to set the maximum descent speed of the estimated vehicle body speed so that it may be increased in accordance with the increase of a value greater than that of the stepping quantity by each control cycle detected by the above described pedal stroke quantity detecting means and the stepping quantity at the skid cycling starting time.

Also, it is preferable that the above described estimated vehicle body speed calculating means is adapted to regulate the bottom value of the estimated vehicle body speed with a value reduced by a given deviation quantity with respect to the maximum value of the estimated vehicle body speed of each wheel such that the deviation quantity may increase in accordance with the increase in a value larger between the stepping quantity of each control cycle and the stepping quantity at the starting time of the skid cycle.

An anti-lock brake controlling apparatus according to the present invention may be provided with a wheel speed detecting means for detecting the speed of each wheel of a vehicle, a wheel movements calculating means for calculating the wheel movements including at least a wheel speed in accordance with the signal from the wheel speed detecting means, a lock symptom detecting means for detecting the lock symptom in accordance with the wheel movements calculated by the above described wheel movements calculating means and the stepping quantity of the brake pedal detected by the above described pedal stroke quantity detecting means.

It is preferable that the above described lock symptom detecting means is adapted to sensitively set the detection sensitivity of the lock symptoms as the stepping quantity of the brake pedal to be detected by the above described pedal stroke quantity detecting means gets smaller.

Also, the above described lock symptom detecting means may sensitively set the detection sensitivity of the lock symptoms as a value larger between the stepping quantity of the brake pedal at each control cycle to be detected by the above described pedal stroke quantity detecting means and the stepping quantity of the brake pedal at the skid cycle start time is smaller.

An anti-lock brake controlling apparatus according to the present invention, wherein the above described fluid pressure control valve is composed of a solenoid valve, the wheel cylinder is adapted to be added, subtracted in fluid pressure by a switching operation of the solenoid valve, comprises a wheel speed detecting means for detecting the speed of each wheel of a wheel, a wheel movements calculating means for calculating the vehicle movements including at least a wheel speed in accordance with a signal from the wheel speed detecting means, a pressure increasing reducing signal setting means for setting the pressure adding subtracting signal which is an instruction to a switching operation with respect to the above described solenoid valve. The pressure increasing reducing signal setting means may set a pressure increasing reducing signal in reducing the fluid pressure of the wheel cylinder in accordance with the wheel movements calculated by the above described wheel movements calculating means and the stepping quantity of the brake pedal detected by the above described pedal stroke quantity detecting means.

It is preferable that the above described pressure increasing reducing signal setting means is adapted to correct, in accordance with the stepping quantity of a brake pedal detected by the above described pedal stroke quantity detecting means, a pressure increasing reducing signal in reducing the fluid pressure of the wheel cylinder set in accordance with the wheel movements calculated by the above described wheel movements calculating means.

The above described pressure increasing reducing signal setting means may correct, in accordance with the larger value between the stepping quantity of a brake pedal at each control cycle detected by the above described pedal stroke quantity detecting means and the stepping quantity at the skid cycle starting time, a pressure increasing reducing signal in reducing the fluid pressure of the wheel cylinder set in accordance with the wheel movements calculated by the above described wheel movements calculating means.

Further, the above described pressure increasing, reducing signal setting means may correct, in accordance with the difference between right left road surface friction coefficients, the pressure increasing reducing signal set in accordance with the wheel movements calculated by the above described wheel movements calculating means and the stepping quantity of the brake pedal detected by the pedal stroke detecting means when the road surface friction coefficient on the road surface on which a vehicle is running is different on right and left sides of the vehicle.

An anti-lock brake controlling means according to the present invention can effect an ideal control operation, because an anti-lock controlling operation is effected with the stepping quantity of a brake pedal corresponding to the road surface friction coefficient as one factor of the controlling operation.

The present invention can estimate the vehicle body speed with high accuracy, considering the road surface friction coefficients when the estimated vehicle body speed calculating means is adapted to calculate the estimated vehicle body speed in a position of each wheel in accordance with the wheel movements calculated by the wheel movements calculating means and the stepping quantity of the brake pedal detected by the pedal stroke quantity detecting means.

The estimated vehicle body speed calculating means can obtain an estimated vehicle body speed of high accuracy about the position of each wheel even if the road surface is a split road surface when the maximum descent speed of the estimated vehicle body speed corresponding to a wheel positioned on a road surface where a road surface friction coefficient is larger is increased in accordance with the increase in the stepping quantity to be detected by the above described pedal stroke quantity detecting means, in a case where the road surface friction coefficient on the road surface where the vehicle is running is largely different on the right and left sides of the vehicle, and is set to a value greater than the maximum descent speed at the uniform road surface time.

The above described estimated vehicle body speed calculating means can obtain the estimated vehicle body speed of high accuracy even during turning when the maximum descent speed of the estimated vehicle body speed corresponding to the wheel positioned on the external side of the turning radius is increased in accordance with the increase in the stepping quantity to be described by the above described pedal stroke quantity detecting means, during the turning operation of the vehicle, and to set a value larger than the maximum descent speed at a straight line running operation.

Also, the above described estimated vehicle body speed calculating means can effect an ideal controlling operation, removing the dispersion of the estimated vehicle body speed when the maximum descent speed of the estimated vehicle body speed is set to increase in accordance with the increase of a value larger between the stepping quantity at each control cycle detected by the above described pedal stroke quantity detecting means and the stepping quantity at the skid cycle starting time.

The present invention can detect the lock symptom with a proper sensitivity corresponding to the road surface friction coefficient when the lock symptom detecting means is adapted to detect the lock symptom in accordance with the wheel movements calculated by the wheel movements calculating means and the stepping quantity of the brake pedal detected by the above described pedal stroke quantity detecting means.

The present invention can set the pressure reduction time at the anti-lock pressure reduction time in accordance with road surface friction coefficients, and prevent excessive pressure reduction on the high μ road surface and insufficient pressure reduction on the low μ road surface when a pressure increasing reducing signal setting means for setting the pressure increasing reducing signal which is an instruction of a switching operation with respect to a solenoid valve, which is a fluid pressure control valve is adapted to set a pressure increasing, reducing signal where the wheel cylinder fluid pressure is reduced in accordance with the wheel movements calculated by the above described wheel movements calculating means and the stepping quantity of the brake pedal detected by the above described pedal stroke quantity. detecting means.

If, in a case of the split road surface, a pressure increasing reducing signal set in accordance with the wheel movements calculated by the wheel movements calculating means and the stepping quantity of the brake pedal calculated by the pedal stroke detecting means is corrected in accordance with the difference of the right and left road surface friction coefficients, a proper pressure increasing reducing signal can be set on each wheel with respect to a solenoid valve corresponding to the wheel cylinder even if the road surface is a split road surface.

BRIEF DESCRIPTION OF THE DRAWINGS

These and other objects and features of the present invention will become apparent from the following description of the preferred embodiments thereof with reference to the accompanying drawings, in which;

FIG. 9 is a partial view of a flow chart showing a modified example in the first embodiment;

DETAILED DESCRIPTION OF THE INVENTION

Figure 1:
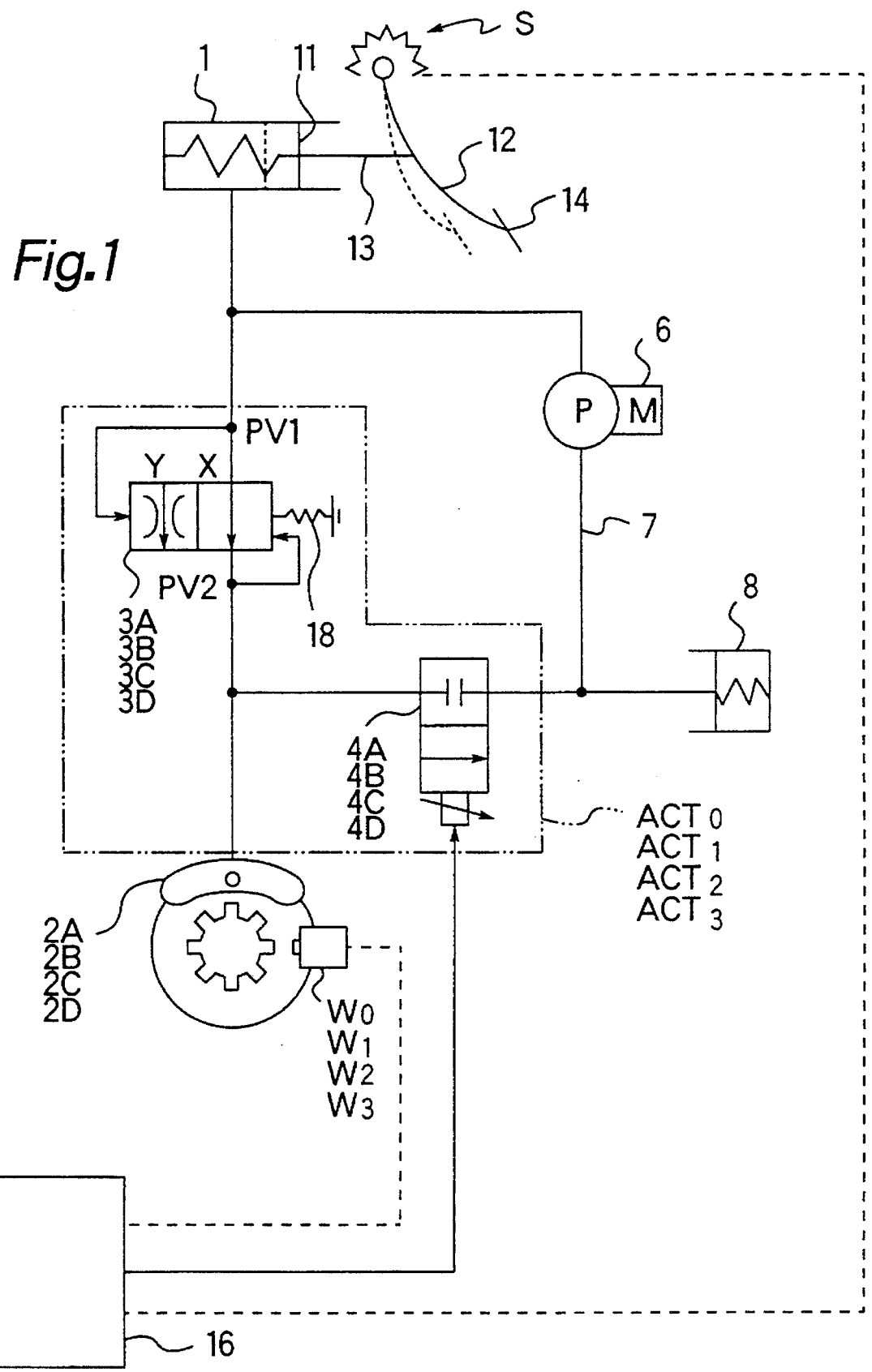
FIG. 1 is a schematic block diagram showing a first embodiment of the present invention.

Before the description of the present invention proceeds, it is to be noted that like parts are designated by like reference numerals throughout the accompanying drawings.

The present invention will be described hereinafter in detail with reference to the drawings.

Figure 2:
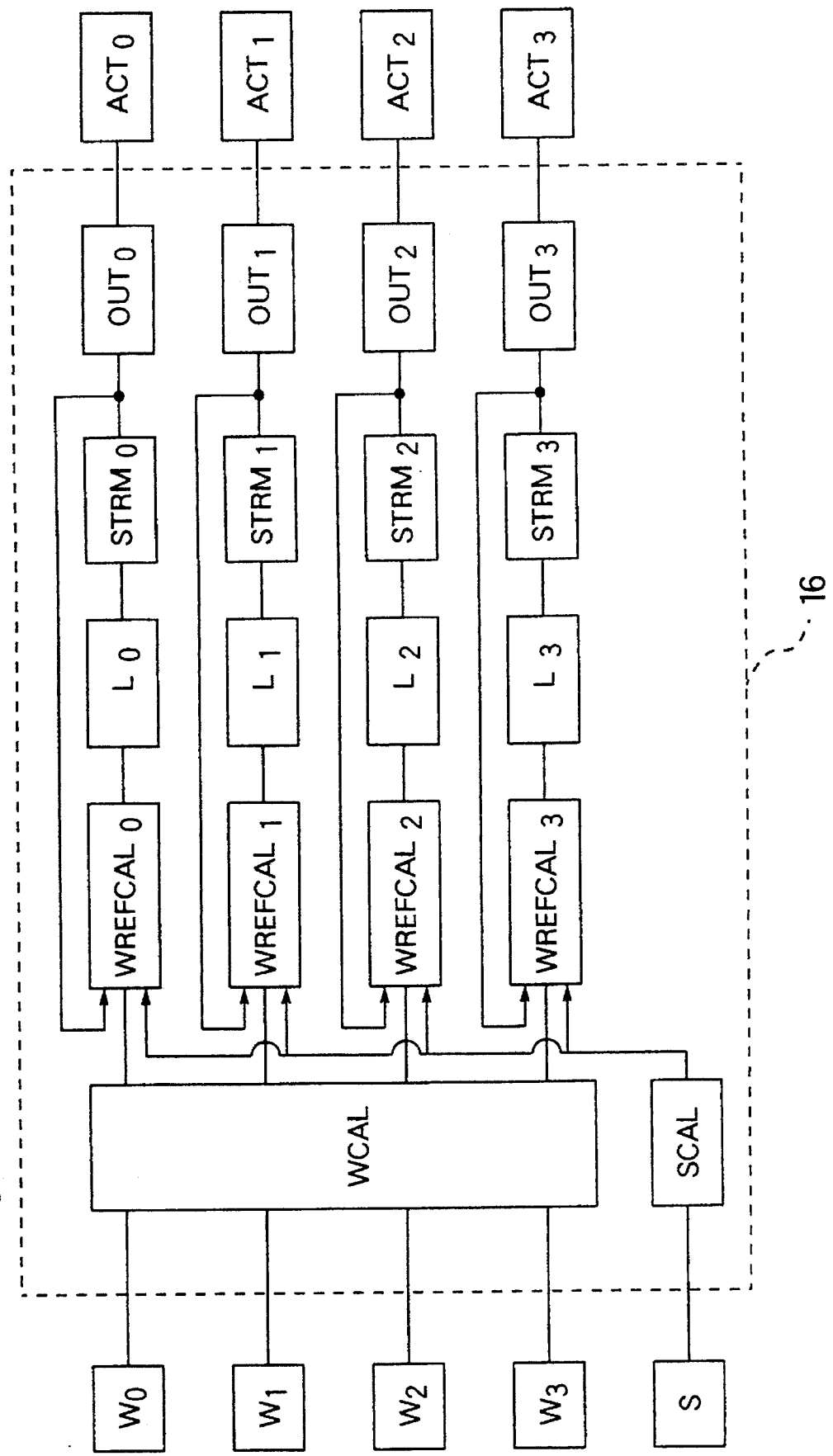
FIG. 2 is a schematic block diagram showing a signal processing portion of the first embodiment.

FIG. 1 and FIG. 2 show an anti-lock brake controlling apparatus in accordance with a first embodiment of the present invention. A control object of the anti-lock brake controlling apparatus is a four-wheel automobile of a front wheel drive.

As shown in FIG. 1, inlet• valves 3A, 3B, 3C, 3D, composed of mechanical valves are disposed between a master cylinder 1 and the wheel cylinders 2A, 2B, 2C, 2D corresponding respectively to a left front wheel, a right front wheel, a left rear wheel, a right rear wheel. A reflux line 7 refluxes from wheel cylinders 2A through 2D onto the side of a master cylinder 1 through outlet•valves 4A, 4B, 4C, 4D, composed of a normally closed on/off type solenoid valve and a motor pump 6. On the reflux line 7, there is disposed a reservoir 8 between the outlet•valves 4A through 4D and a motor pump 6.

A fluid pressure PV1 on the upstream side, and a fluid pressure PV2 on a downstream side, are applied upon the inlet•valves 3A through 3D. An urging force of a spring means 18 is applied in a direction the same as that of the fluid pressure PV2.

Although a position becomes an X position shown at a normal time in the inlet•valves 3A through 3D, the fluid pressure PV1 on the upstream side becomes greater than the fluid pressure PV2 on the downstream side. When the difference between PV1 and PV2 exceeds the urging force spring means 18, the position becomes a Y position shown. The fluid pressure of the wheel cylinder 1 is fed onto the sides of the wheel cylinders 2A through 2D through an orifice.

The anti-lock controlling apparatus closes the outlet•valves 4A through 4D when the fluid pressure of the wheel cylinders 2A through 2D are applied during the anti-lock controlling operation, and opens the outlet•valves 4A through 4D when the fluid is reduced.

Inlet•valves 3A through 3D may be a normally open on/off type solenoid valves. In this case, the fluid pressure is controlled in accordance with one of three modes: a pressure reducing mode wherein the inlet•valves 3A through 3D are open and the outlet•valves 4A through 4D are turned off during the normal operation time of the brake, and the inlet •valves 3A through 3D are closed, the outlet•valves 4A though 4D are open during the anti-lock controlling time, a retaining mode wherein both the inlet•valves 3A through 3D and the outlet•valves 4A though 4D are closed, and a pressure increasing mode wherein the inlet•valves 3A through 3D are open, while the outlet•valves 4A through 4D are closed.

Reference characters $W_0$, $W_1$, $W_2$, $W_3$ are a wheel speed detecting means. The accompanied numerals 0, 1, 2, 3 show a left front wheel, a right front wheel, a left rear wheel, a right rear wheel respectively. The wheel speed detecting means $W_0$ through $W_3$ respectively detect the speed of the corresponding wheel and feeds it to a signal processing portion 16 to be described later as a wheel speed signal.

Reference character S is a pedal stroke quantity detecting means. The pedal stroke quantity detecting means S is adapted to detect the stepping quantity (extent of physical depression) of the brake pedal 14, coupled through a lever 12 and a rod 13 to the piston 11 of the master cylinder 1. When the brake pedal 14 moves to a dotted line in FIG. 1 from depression by a driver from a non-depressed condition of brake pedal 14 shown with a solid line in FIG. 1, the detecting means S detects the stepping quantity and feeds it to signal processing potion 16.

The pedal stroke quantity detecting means S of the first embodiment includes a known encoder for detecting an angle of rotation of lever 12 to detect the stepping quantity of a brake pedal 14 also. The pedal stroke quantity detecting means S may use a secondary position sensor of a differential transformer type which detects, for example, the movement of rod 13, without being restricted to the above described encoder.

The signal processing portion 16 is a micro processor which includes, as shown in FIG. 2, a wheel movement calculating means WCAL, a pedal stroke quantity calculating means SCAL, an estimated vehicle body speed calculating means $WREFCAL_0$, $WREFCAL_1$, $WREFCAL_2$, $WREFCAL_3$, lock symptom detecting means $L_0$, $L_1$, $L_2$, $L_3$, a pedal stroke quantity storing means $STRM_0$, $STRM_1$, $STRM_2$, $STRM_3$, and a solenoid signal setting means $OUT_0$, $OUT_1$, $OUT_2$, $OUT_3$.

Reference characters $ACT_0$, $ACT_1$, $ACT_2$, $ACT_3$ are actuators corresponding to inlet •valves 3A through 3D and the outlet valves 4A through 4D, respectively.

Wheel speed signals are input from wheel speed detecting means $W_0$ through $W_3$ to the wheel movements calculating means WCAL. A wheel speed $SPEED_i$ (i=0, 1, 2, 3), a first differential value of the wheel speed $SPEED_i$, and a second differential value of the wheel speed $SPEED_i$ are calculated from the signal.

A signal is input from the pedal stroke quantity detecting means to the pedal stroke quantity calculating means SCAL. The pedal stroke quantity STR calculated from the signal is output to estimated vehicle body speed calculating means $WREFCAL_0$ through $WREFCAL_3$.

Wheel speed $SPEED_i$, a pedal stroke quantity STR at each control cycle, and a pedal stroke quantity $STRE_i$ at the skid cycle starting time (to be described later) are input to the estimated vehicle body speed calculating means $WREFCAL_0$ through $WREFCAL_3$ to calculate the estimated vehicle body speed $WREF_i$ about each wheel.

Lock symptom detecting means $L_0$ through $L_3$ detect whether a wheel is locked (a lock symptom) from the differential values of the above described estimated vehicle body speed $WREF_1$ and the vehicle wheel speed $SPEED_1$.

Pedals stroke quantity storing means $STRM_0$ through $STRM_3$ store and retain the pedal stroke quantity $STRE_i$ at the skid cycle start time of the wheel, namely, at a lock symptom detecting edge.

Pressure regulating signal setting means $OUT_0$ through $OUT_3$ set a pressure regulating signal $K_i$ for opening or closing with respect to outlet•valves 4A through 4B, which it passes to actuators $ACT_0$ through $ACT_3$.

An operation in the first embodiment will be described hereinafter with reference to a flow chart shown in FIG. 3. Signal processing portion 16 calculates the operation shown in FIG. 3 at a constant period (control cycle). In the first embodiment, a period of time for a first control cycle is 8 msec.

In a step #1, a wheel speed signal from the wheel speed detecting means $W_0$ trough $W_3$ are input to the wheel movement calculating means WCAL. At the same time, a signal from the pedal stroke quantity detecting means S is input to pedal stroke quantity calculating means SCAL.

In a step #2, the wheel movement calculating means WCAL calculates a wheel speed $SPEED_i$, a differential value $d/dt\ SPEED_i$, and a second differential value $d^2/dt^2\ SPEEDi/dt^2$ for each wheel. The pedal stroke quantity calculating means SCAL calculates the pedal stroke quantity STR.

In a step #3, estimated vehicle body speed calculating means $WREFCAL_0$ through $WREFCAL_3$ calculate the estimated vehicle body speed $WREF_i$ for each wheel. In the step #3, the estimated vehicle body speed $WREF_i$ is calculated as shown by the flow chart of FIG. 4.

Figure 4:
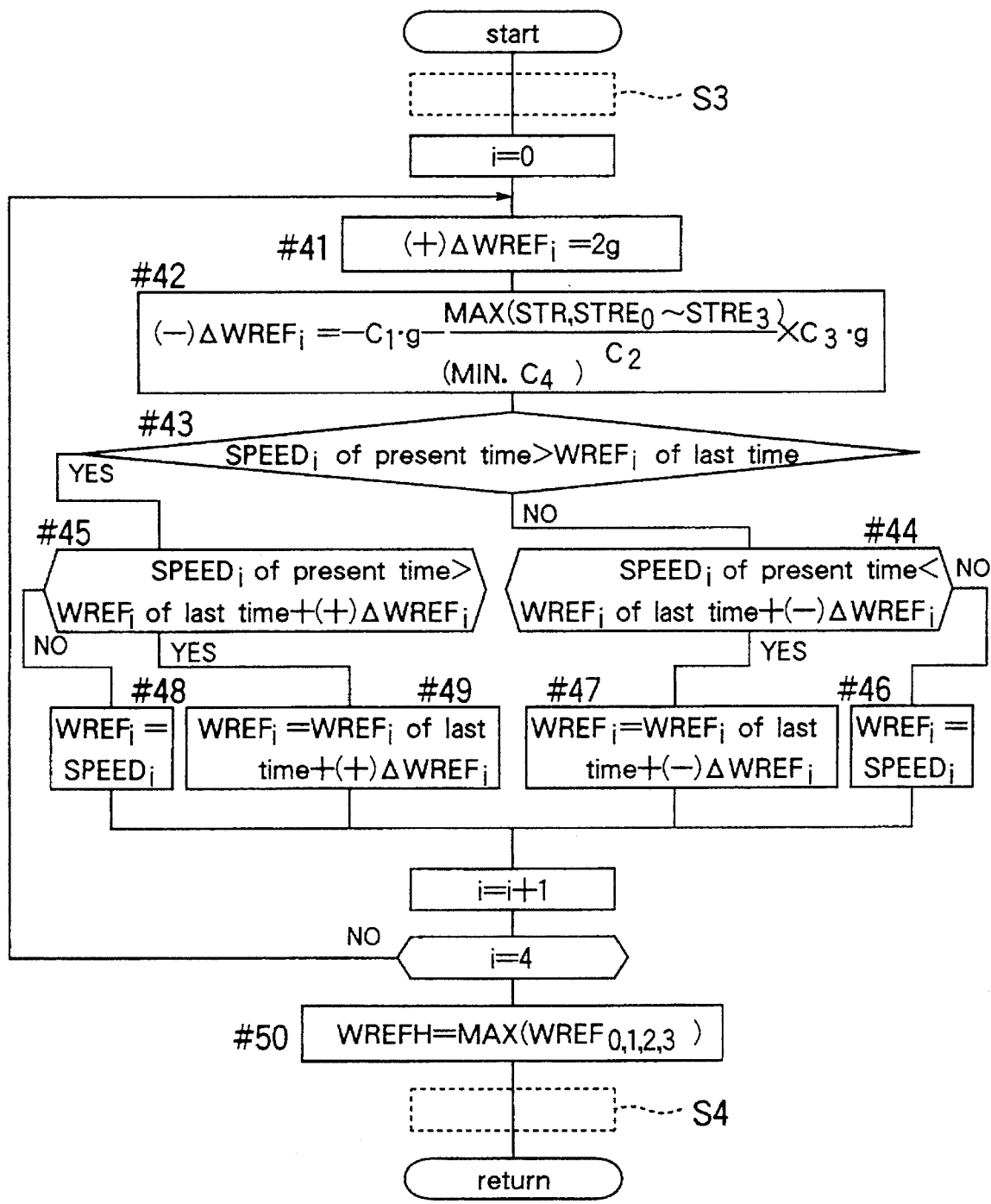
FIG. 4 is a flow chart showing the details of a step #3 of FIG. 3.

In a step #41 in FIG. 4, a maximum rising speed (+) $\Delta WEREF_i$ is set. The maximum rising speed (+) $\Delta WEREF_i$ indicates the maximum allowable acceleration of a vehicle, i.e., a maximum allowable variation between the estimated vehicle body speed $WREF_i$ during the present control cycle and the estimated vehicle body speed $WREF_i$ during the following control cycle. In the first embodiment, the maximum rising speed (+) $\Delta WEREF_i$ is set to 2 g (g is gravity acceleration).

In a step #42, a maximum descent speed (−) $\Delta WEREF_i$ is set. The maximum descent speed (−) $\Delta WEREF_i$ indicates the maximum allowable speed reduction of the vehicle, i.e., a maximum allowable variation between the estimated vehicle body speed $WREF_i$ during the present control cycle and the estimated vehicle body speed $WREF_i$ during the following control cycle.

In the first embodiment, the maximum descent speed (−) $\Delta WREF_i$ is set to a value corresponding to a road surface μ. Namely, when the vehicle is moving on a high μ road surface, e.g., an asphalt road, the maximum descent speed (−) $\Delta WREF_i$ is relatively large. When the vehicle is moving on a low μ road surface, e.g., a snow-covered road or ice-covered road, the maximum descent speed (−) $WREF_i$ is relatively small.

In the first embodiment, since the maximum descent speed (−) $\Delta WREF_i$ is set in accordance with the road surface μ, pedal stroke quantity STR is considered. On a high μ road surface, a lock symptom is detected when both the stepping quantity of the brake pedal 14 and the wheel cylinder fluid pressure are relatively high. On the low μ road surface, a lock symptom is detected when both the stepping quantity of the brake pedal 14 and the wheel cylinder fluid pressure are relatively low. A supposition can be therefore used that the vehicle is on a high μ road surface when the pedal stroke quantity STR is high, and on a low μ road surface when the pedal stroke quantity STRE is low.

In the first embodiment, the maximum descent speed (−) $\Delta WREF_i$ is set by the following equation (1).

$$(-) \Delta WREF_i = \quad (1)$$
$$-C_1 \cdot g - \{MAX\ (STR, STRE_0\ through\ STRE_3)/C_2\} \times$$
$$C_3 \cdot g\ (Min.\ C_4)$$

The STR is a pedal stroke quantity in each control cycle and the $STRE_0$ through $STRE_3$ are pedal stroke quantities at the start time of the skid cycle stored, as retained by each pedal stroke quantity storing means $STRM_0$ through $STRM_3$. Reference character MAX means a greater value of a pedal stroke quantity STR in each control cycle and the pedal stroke quantity at the starting time of the above described skid cycle $STRE_0$ through $STRE_3$. Reference character Min means that the (−) $\Delta WREF_i$ is set at $C_4$ when the maximum descent speed (−) $\Delta WREF_i$ calculated from the equation (1) exceeds $C_4$. Reference characters $C_1$, $C_2$, $C_3$, $C_4$ are constants set in accordance with the brake characteristics. In the first embodiment, $C_1 = 0.3$, $C_2 = 80$, $C_3 = 0.9$, and $C_4 = -1.2$ g.

Figure 5:
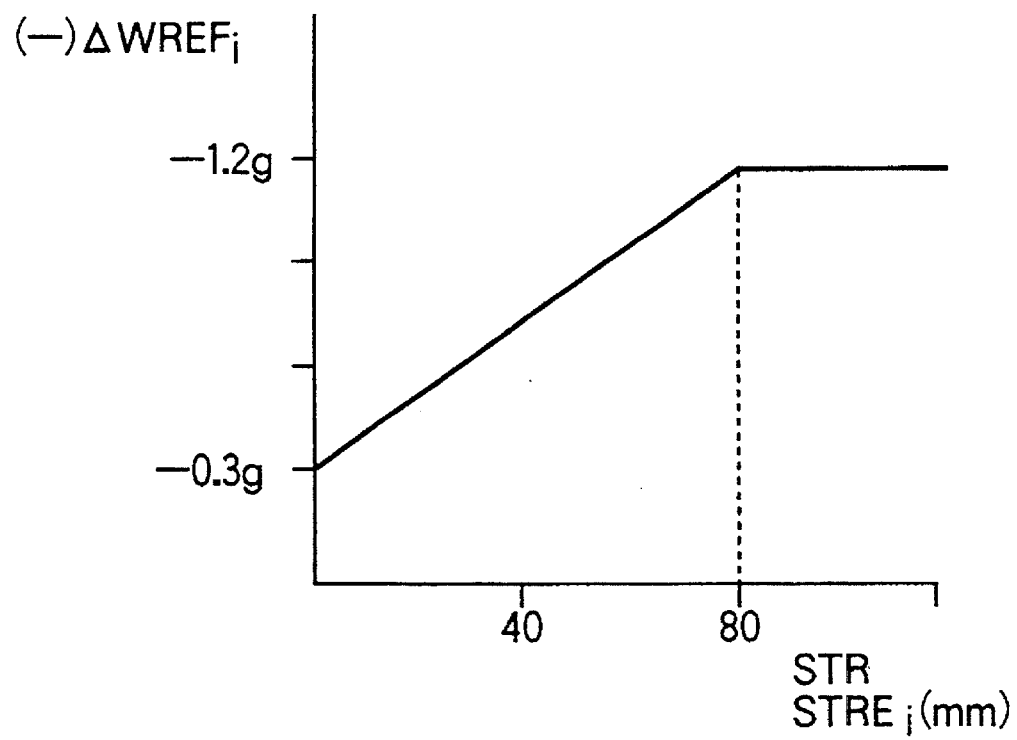
FIG. 5 is a block diagram showing the relation between a pedal stroke quantity and a maximum descent speed.

FIG. 5 shows the relation between the maximum descent speed (−) $\Delta WREF_i$ and the pedal stroke quantity STR, $STRE_i$ when $C_1$, $C_2$, $C_3$, $C_4$ have been set to the above described values. As shown in FIG. 5, in the first embodiment, the value of maximum descent speed (−) $\Delta WREF_i$ is proportional to the pedal stroke quantities STR, $STRE_i$. When the pedal stroke quantity STR or $STRE_i$ exceeds 80 mm, (−) $\Delta WREF_i$ is set at −1.2 g.

The relationship between maximum descent speed (−) $\Delta WREF_i$ and the pedal stroke quantity STR, $STRE_i$ is not restricted to those of FIG. 5, but need only increase the maximum descent speed (−) $\Delta WREF_i$ in accordance with the increase of the pedal stroke quantities ST, $STRE_i$.

In a step #43, a wheel speed $SPEED_i$ of the present control cycle is compared with an estimated vehicle body speed $WREF_i$ obtained by the previous control cycle. If wheel speed $SPEED_i \leq WREF_i$ of the previous control cycle, control passes to a step #44. If wheel speed $SPEED_i > WREF_i$ of the previous cycle, control passes to a step #45.

At step #44, wheel speed $SPEED_i$ is compared with a total of the maximum descent speed (−) $\Delta WREF_i$ and the estimated vehicle body speed $WREF_i$ of the previous control cycle present. When the wheel speed $SPEED_i$ of the control cycle is greater, namely, when the wheel speed $SPEED_i$ is within the maximum variance range from the previous estimated vehicle body speed $WREF_i$, then the wheel is not skidding, and control passes to step #46. At a step #46, the $WREF_i$ obtained at the present control cycle is set to a speed equal to the wheel speed $SPEED_i$.

If, however, at a step #44, the wheel speed $SPEED_i$ of the present control cycle is smaller than a total of the maximum descent speed (−) $\Delta WREF_i$ and to the estimated vehicle body speed $WREF_i$, namely, when the wheel speed $SPEED_i$ of the present control cycle has fallen below the maximum variance from the previous estimated vehicle body speed $WREF_i$, the estimated vehicle body speed $WREF_i$ of the present control cycle is set to the total of the maximum speed (−) $\Delta WREF_i$ and the previous estimated vehicle body speed $WREF_i$.

At step #45, a wheel speed $SPEED_i$ of the present control cycle is compared with a total of the maximum ascent speed (+) $\Delta WREF_i$ and the estimated vehicle body speed $WREF_i$ of the previous control cycle. If the wheel speed $SPEED_i$ is not greater, namely, when the wheel speed $SPEED_i$ is within a maximum variance from the previous estimated vehicle body speed $WREF_i$ then the wheel is not skidding and control passes to step 48. At a step #48, the $WREF_i$ of the present control cycle is set to a speed equal to the wheel speed $SPEED_i$.

At a step #45, when the wheel speed $SPEED_i$ of the present control cycle is greater than the total of a maximum ascent speed (+) $\Delta WREF_i$ and the estimated vehicle body speed $WREF_i$, namely, when the wheel speed $SPEED_i$ exceeds a maximum variance from the previous estimated vehicle body speed $WREF_i$, the present estimated vehicle body speed $WREF_i$ is set to a total of the maximum ascent speed (+) $\Delta WREF_i$ and the previous estimated vehicle body speed $WREF_i$.

At a step #50, a maximum estimated vehicle body speed WREFH, which is a maximum value of the estimated vehicle body speed $WREF_0$ through $WREF_3$, is obtained.

Figure 3:
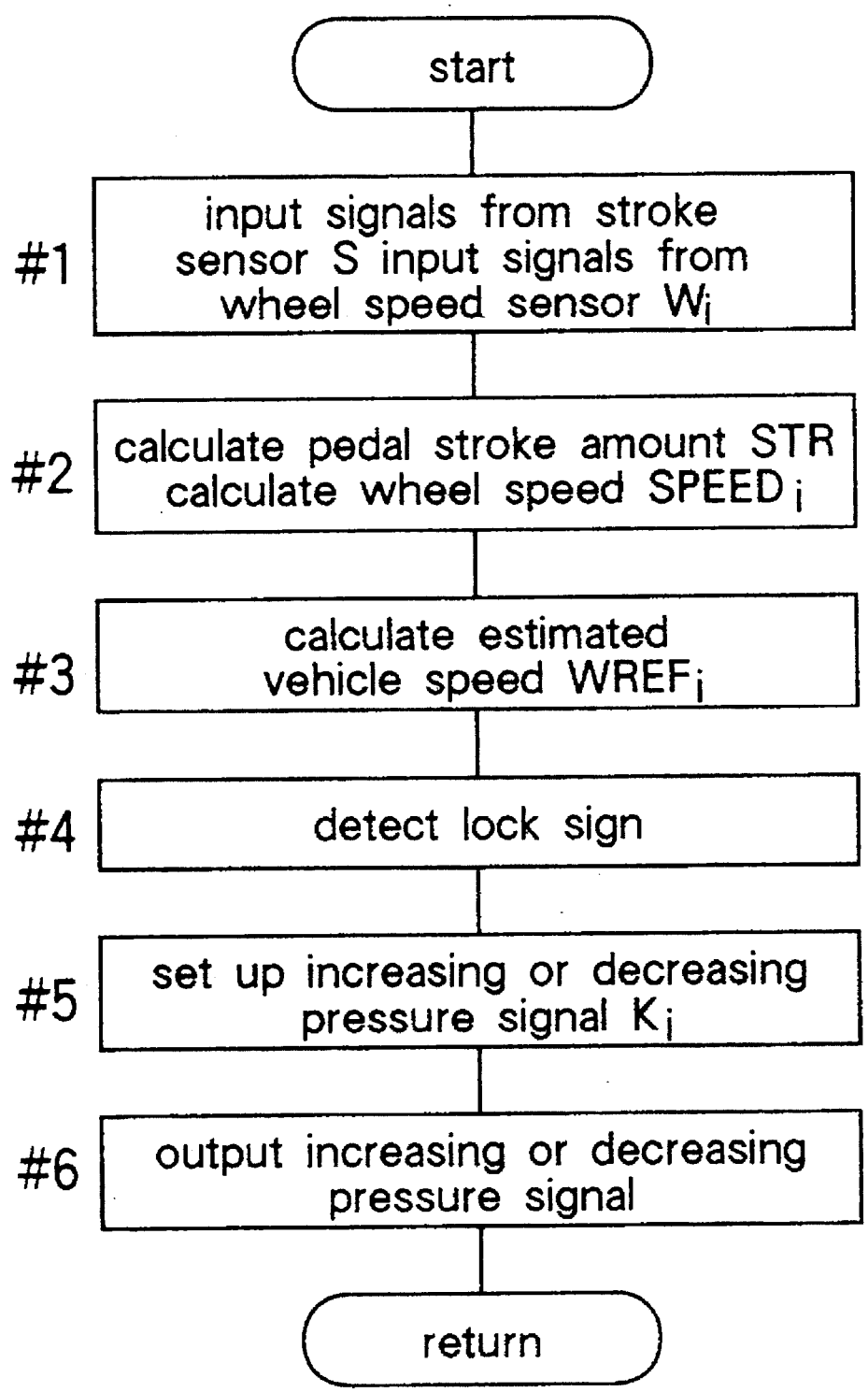
FIG. 3 is a flow chart showing the operation in the first embodiment.

At a step #4 in FIG. 3, lock symptom detecting means $L_0$ through $L_3$ detect a presence of the lock symptom about each wheel. The process of step #4 is shown in FIG. 6.

Figure 6:
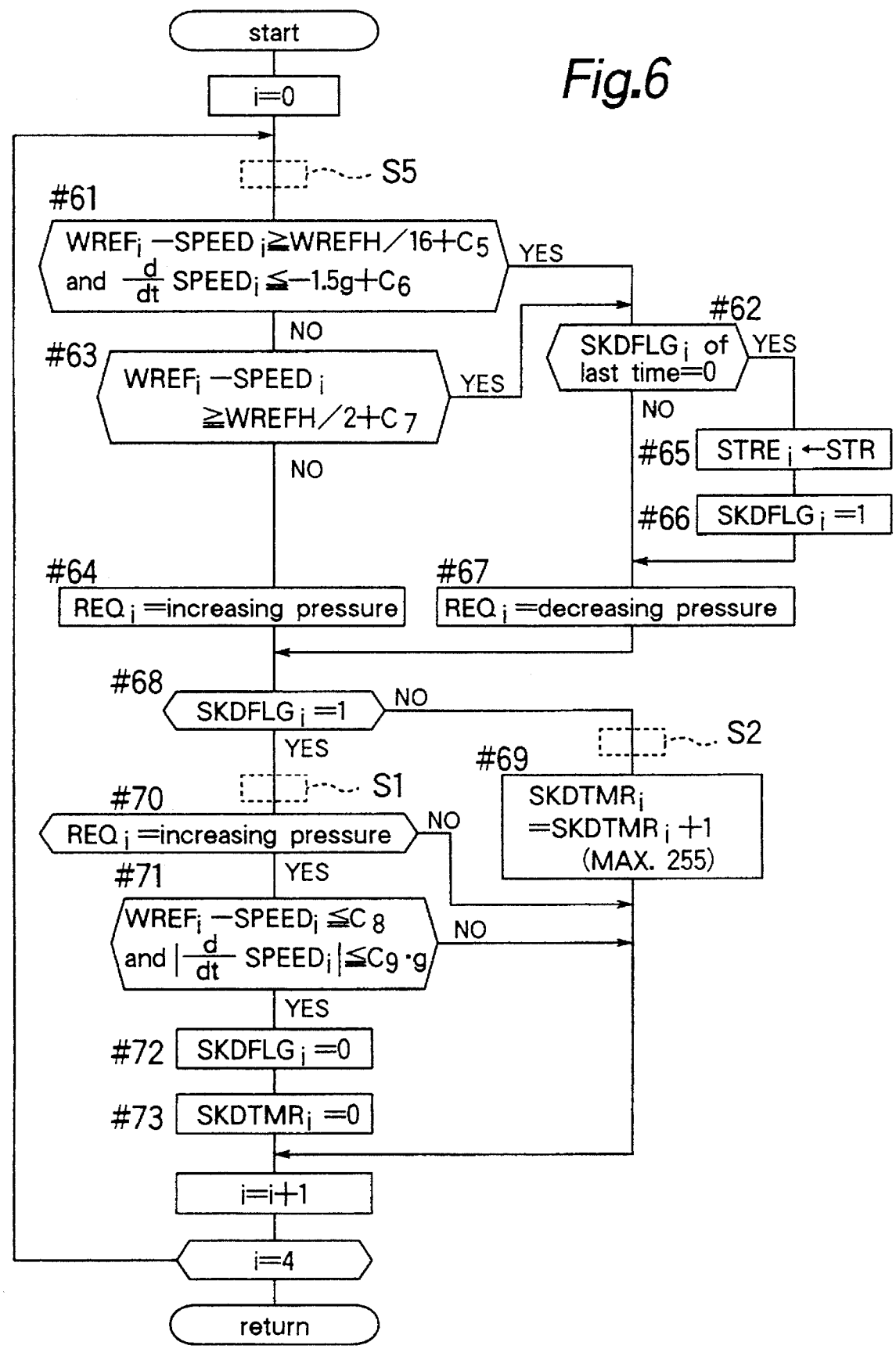
FIG. 6 is a flow chart showing the detail of a step #4 of FIG. 3.

At a step #61 in FIG. 6, it is checked whether or not the following equation (2) is satisfied. If so, a lock symptom exists, and control passes to a step #62. If not control passes to a step #63.

$$WREF_i - SPEED_i \geq WREFH/16 + C_5\ and\ d/dt\ (SPEED_i) \leq -1.5\ g + C_6 \quad (2)$$

wherein $C_5$, $C_6$ are threshold values set in accordance with the brake characteristic. In the first embodiment, $C_5 = 2$, and $C_6 = 2$.

At a step #63, it is checked whether or not the equation (3) is satisfied. If so, a lock symptom exists, so as to move the step to a step #62. If not, the step moves to a step #64.

$$WREF_i - SPEED_i \geq (WREFH/2) + C_7 \quad (3)$$

wherein $C_7$ is a value set in accordance with brake characteristics. In the present embodiment, $C_7 = 5$.

At a step #62, a skid flag $SKDFLG_i$ at the previous control cycle is checked. The skid flag $SKDFLG_i$ indicates whether or not the wheel is in a skid condition (a skid cycle), i.e., a period of time required for the wheel speed $SPEED_i$ and the estimated vehicle body speed $WREF_i$ to re-synchronize (a synchronized condition), in which the lock symptom detecting edge is set to "1", and the synchronized condition is set to "0". When the skid flag $SKDFLG_i$ is "0", the synchronization condition is established in the previous control cycle, i.e., $SPEED_i$ was in synch with $WREF_i$. As the lock symptom is detected in the present control cycle, it is equivalent to a lock symptom detecting edge, (the skid cycle starting time). In this case, the step moves to a step #65 to store the pedal stroke quantity STR at the present control cycle as $STRE_i$ in the pedal stroke quantity storing means $STRM_i$. At the step #66, the skid flag $SKDFLG_i$ is set to "1". At a step #67, a control request $REQ_i$ is set to "pressure reduction".

At step #62, if the skid flag $SKDFLG_i$ was previously "1", the wheel was in a skid condition and is not, the lock symptom detecting edge, so that the step directly moves to step #67.

If equation (3) is not satisfied at step #63, a lock symptom is not detected. Therefore, at the step #64, the control request $REQ_i$ is set to "pressure increase".

At a step #68, the skid flag $SKDFLG_i$ in the present control cycle is checked. In a case of "0", (not a skid condition) "1" is added to the skid timer $SKDTMR_i$ at a step #69. The skid timer $SKDTMR_i$ which monitors a period of time when the skid flag $SKDFLG_i$ is "0" about each wheel, has a maximum value set at 255 in the present embodiment.

If the skid flag $SKDFLG_i$ is "1" at a step # 68, it is checked at a step #70 if the control request $REQ_i$ is "pressure increase". When it is the "pressure increase", the step moves to a #71. At the step #71, it is checked whether or not the synchronization condition is restored.

$$WREF_i - SPEED_i \leq C_8 \text{ and } |d/dt (SPEED_i)| \leq C_9 \cdot g \quad (4)$$

wherein $C_8$, $C_9$ are constants to be set in accordance with the brake characteristic of the vehicle. In the present embodiment, $C_8=2$, $C_9=1$.

At a step #71, synchronization condition is recovered when equation (4) is satisfied and the step moves to a step #72 so as to set the skid flag $SKDFLG_i$ to "0". Also, at a step #73, the skid timer $SKDTMR_i$ is cleared to "0".

At a step #5 in FIG. 3, a pressure regulating signal $K_i$ is set in accordance with the absence or presence of the detection of a wheel speed $SPEED_i$ calculated at the step #2, an estimated vehicle body speed $WREF_i$ set at the step #3, and a lock symptom detected at the step #4.

The pressure regulating signal $K_i$ instructs the switching operation of the outlet •valves 4A through 4D of the actuator $ACT_0$ through $ACT_3$.

The pressure regulating signal $K_i$ is set between −8 and 7 to regulate a combination of a pressure reduction time $\Delta tdump$ when the fluid pressure of the wheel cylinders 2A through 2D is reduced by the switching operation of the outlet•valves 4A through 4D and a pressure adding time $\Delta tapply$ when the fluid pressure of the wheel cylinders 2A through 2D is applied. In the first embodiment, the values of the pressure applying time $\Delta tapply$ and the pressure reducing time $\Delta tdump$ are shown in Table 1.

For example, a pressure regulating signal $K_0$ (a left front wheel, i=0) is set to 0, the pressure regulating signal $K_0$ opens and closes the outlet•valves 4A to add pressure for $\Delta tapply_0$=24 msec with respect to the actuator $ACT_0$, and $\Delta tdump_0$=8 msec.

TABLE 1

| K | Δt dump (msec) | Δt apply (msec) |
|---|---|---|
| −8 | 225 | 0 |
| −7 | 32 | 6 |
| −6 | 24 | 6 |
| −5 | 24 | 8 |
| −4 | 12 | 8 |
| −3 | 8 | 8 |
| −2 | 8 | 12 |
| −1 | 8 | 16 |
| 0 | 8 | 24 |
| 1 | 8 | 32 |
| 2 | 8 | 40 |
| 3 | 8 | 50 |
| 4 | 8 | 60 |
| 5 | 8 | 70 |
| 6 | 8 | 100 |
| 7 | 8 | 100 |
| 8 | 0 | 255 |

Figure 7:
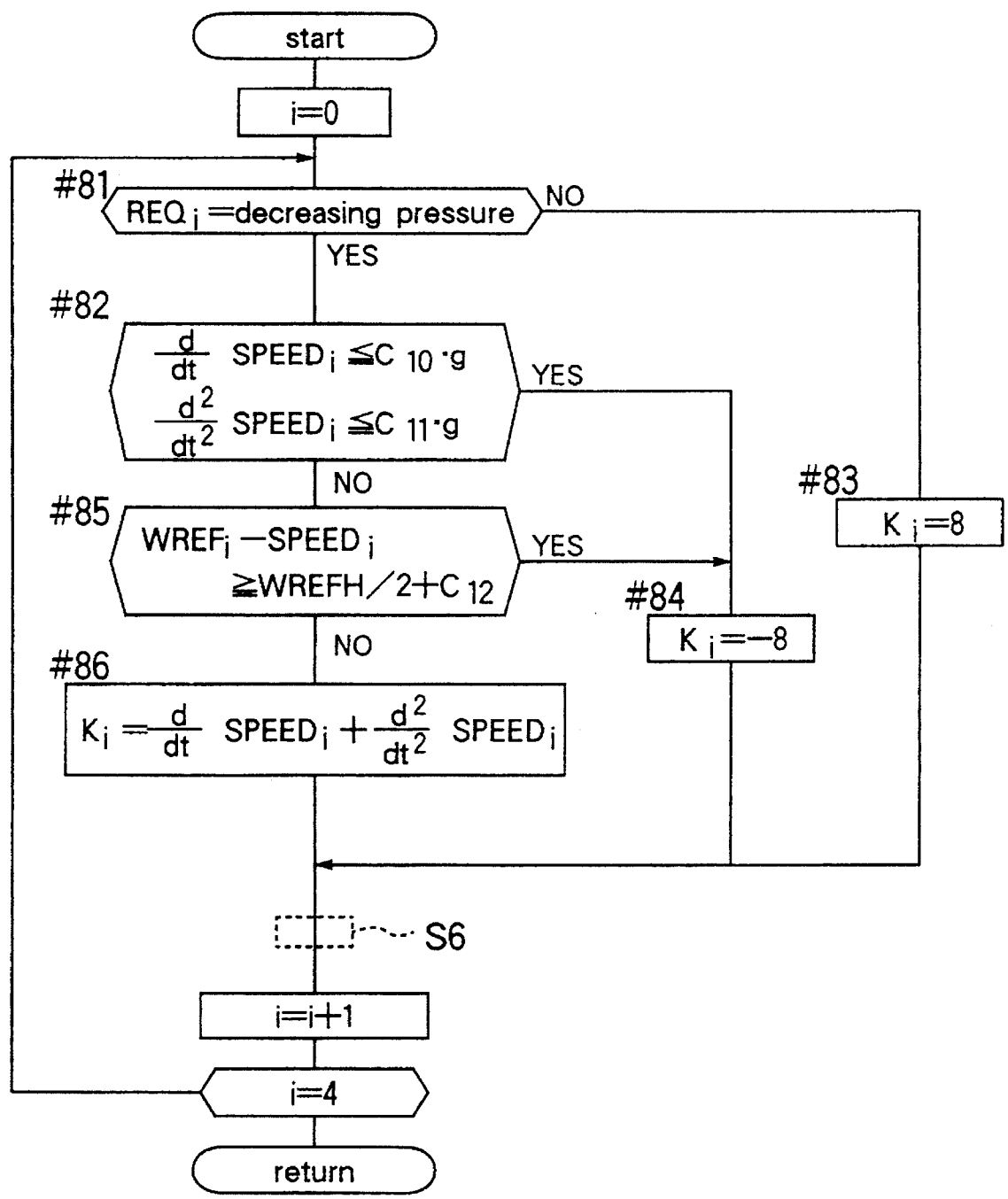
FIG. 7 is a flow chart showing the details of a step #5 of FIG. 3.

A processing operation of step #5 is shown in FIG. 7.

At a step #81 in FIG. 7, the control request $REQ_i$ is checked. In a case of the "pressure reduction", the step moves to a step #82. In a case of "pressure increase", the step moves to a step #83. At a step #83, the pressure regulating signal $K_i$ is set at "8".

At a step #82, it is checked whether or not an abrupt skid is in progress by the following equation (5).

$$d/dt (SPEED_i) \leq C_{10} \cdot g \text{ or}$$

$$d^2/dt^2 (SPEED_i) \leq C_{11} \cdot g \quad (5)$$

wherein $C_{10}$ and $C_{11}$ are constants to be set in accordance with brake characteristics and in the present embodiment, $C_{10}=-3$, $C_{11}=-1$. In the equation (5), a unit of $d^2/dt^2$ $(SPEED_i)$ is (g/control cycle).

If equation (5) is satisfied at a step #82, an abrupt skid is in progress and thus, the step moves to a step #84. At a step #84, the pressure regulating signal $K_i$ is set to −8. As shown Table 1, the pressure reducing time $\Delta tdump$ is 255, the pressure adding time a taplly is 0 when the pressure regulating signal $K_i$ is −8, thus resulting whole pressure reduction. If equation (5) is not satisfied at a step #82, the step moves to a step #85.

At a step #85, it is checked whether or not the width of the skid is large by the following equation (6).

$$WREF_i - SPEED_i \geq (WREFH/2) + C_{12} \quad (6)$$

The $C_{12}$ in the above described equation (6) is a constant to be set in accordance with brake characteristics. $C_{12}=5$ in the present embodiment.

If equation (6) is satisfied at a step #85, it is estimated that the width of the skid is considerably great, and the step moves to the above described step #84. If equation (6) is not satisfied, the step moves to a step #86.

At a step #86, a pressure regulating signal $K_i$ is set in accordance with the following equation (7).

$$K_i = d/dt (SPEED_i) + d^2/dt^2 (SPEED_i) \quad (7)$$

At a step #6 in FIG. 3, the pressure regulating speed signal is output to actuators $ACT_i$.

Figure 8:
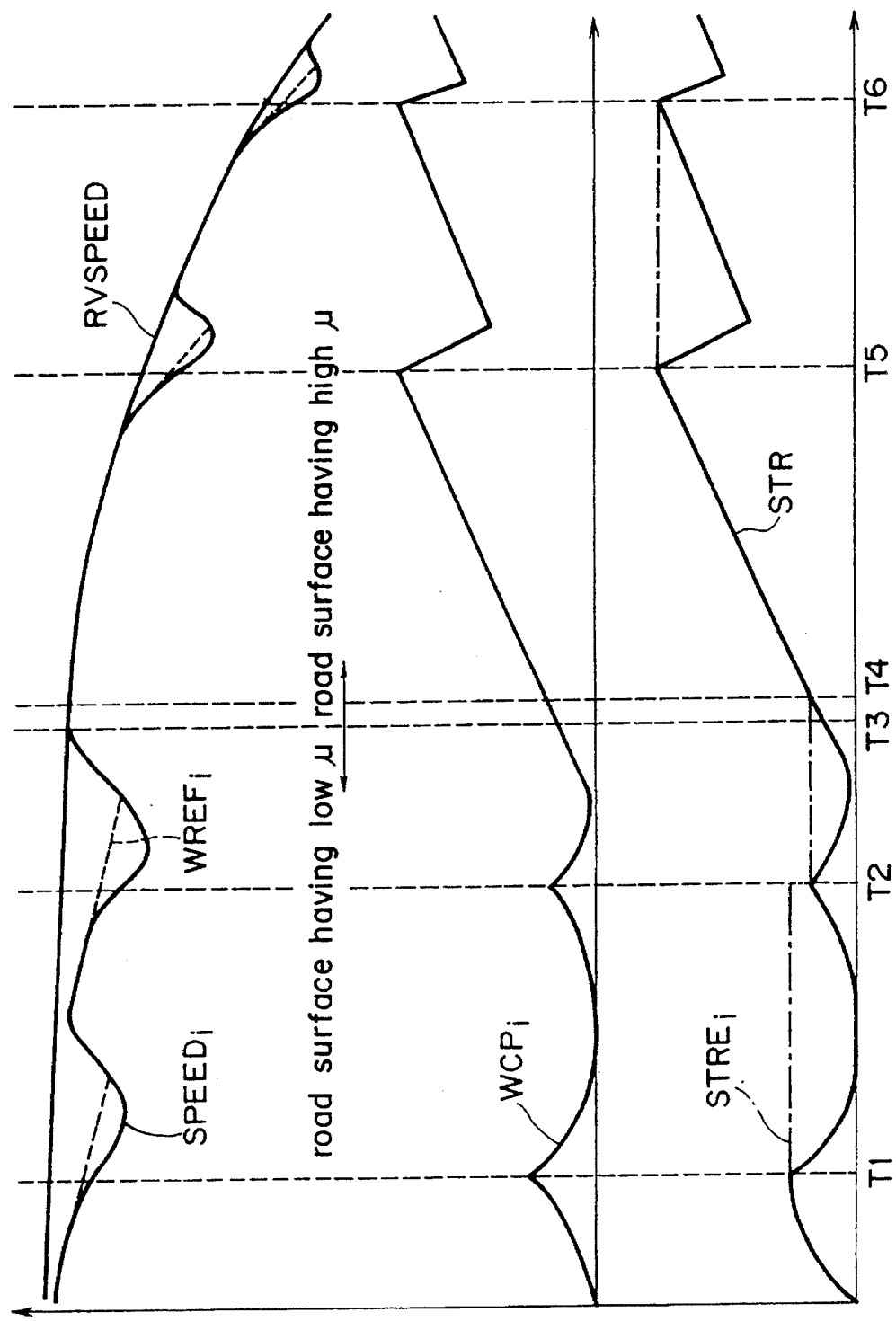
FIG. 8 is a block diagram showing one example of an operation in the first embodiment.

FIG. 8 indicates the relation of a time lapse with respect to an actual vehicle body speed (actual vehicle body speed RVSPEED) in a case where a decelerating vehicle is moving towards a high μ road surface from a low μ road surface, an estimated vehicle body speed $WREF_i$ about one wheel, a wheel speed RVSPEED), a pedal stroke quantity STR, and a wheel cylinder fluid pressure $WCP_i$.

When a first lock symptom is detected at a time T1 so as to start the skid cycle, a pressure increasing, reducing signal $K_1$ for reducing the pressure of the wheel cylinder fluid pressure $WCP_i$ is output with respect to the actuator $ACT_i$ so as to start the pressure reduction of the wheel cylinder fluid pressure $WCP_i$.

A pedal stroke quantity STR at time T1 is stored as a pedal stroke quantity $STRE_i$ at the starting time of the skid cycle in the pedal stroke storing means $STRM_i$.

As the pedal stroke quantity $STRE_i$ stored in the pedal stroke storing means $STRM_i$ is greater than the pedal stroke quantity STR detected at each control cycle prior to a time T2, the maximum descent speed (−) $WREF_i$ is set in accordance with the pedals stroke quantity $STRE_i$, and the estimated vehicle body speed $WREF_i$ is calculated in accordance with the set value.

When a second lock symptom is detected and the skid cycle is started again at time T2, the pedal stroke quantity STR at the time T2 is newly stored, in the pedal stroke quantity storing means $STRM_i$. Thereafter, the maximum descent speed (−) $\Delta WREF_i$ is set in accordance with the newly stored pedal stroke quantity $STRE_i$.

At a time T3, the vehicle moves from the low μ road surface onto the high μ road surface. When the vehicle moves onto the high μ road surface, lock symptoms do not occur at a wheel cylinder fluid pressure WCP on the above described low μ road surface, and the pedal stroke quantity STR is gradually increased. At a time T4, it becomes larger than the pedal stroke quantity STRE stored in the pedal stroke quantity storing means $STRM_i$. Therefore, after a time T4 and the maximum descent speed (−) $\Delta WREF_i$ at the step #42 in the above described FIG. 4 is set in accordance with the pedal stroke quantity STR at each control cycle, and the estimated vehicle body speed $WREF_i$ is calculated from the set value. Accordingly, after a time T4, the ratio of the speed reduction of the estimated vehicle body speed $WREF_i$ increases.

At a time T5, a third lock symptom is detected. As a vehicle runs on a high μ road surface as described hereinabove at a time T5, the wheel cylinder fluid pressure is relatively high. The maximum descent speed (−) $\Delta WREF_i$ is set in accordance with the relatively large pedal stroke quantity $STRE_i$ for a period of time required for the lock symptom to be detected again from the time T5 to the time T6, and the estimated vehicle body speed $WREFH_i$ is calculated in accordance with it.

In the first embodiment as described hereinabove, considering the pedal stroke quantity STR of brake pedal 14 corresponds to the road surface μ, the maximum descent speed (−) $\Delta WREF_i$ of the estimated vehicle body speed WREFi is set in accordance with the pedal stroke quantity STR. Therefore, the descent speed (−) $\Delta WREF_i$ of the estimated vehicle body speed $WREF_i$ is set greater on the high μ road surface and it can be set smaller on the low road surface. The estimated vehicle body speed $WREF_i$ can be calculated correctly considering the difference of the friction coefficient of the road surface, and the anti-lock brake controlling operation conformed to the road surface condition can be effected.

In the above described first embodiment, the maximum descent speed (−) $\Delta WREF_i$ is determined from the larger one of the pedal stroke quantity STR at each control cycle and the pedal stroke quantity $STRE_0$ through $STRE_3$ stored in the pedal stroke quantity storing means $STRM_i$ as shown in the equation (1). The maximum descent speed (−) $\Delta WREF_i$ may, however, be calculated from the pedal stroke quantity STR at each control cycle without comparison between the STR and the $STRE_i$.

Namely, the maximum descent speed $-\Delta WREFi$ may be calculated by the following equation (8) with the step #42 of FIG. 4 being replaced by a step #42' shown in FIG. 9.

$$(-) \Delta WREF_i = -C_1 \cdot g - (STR_i/C_2) \times C_3 \cdot g$$

$$(\text{Min. } C_4) \tag{8}$$

Figure 10:
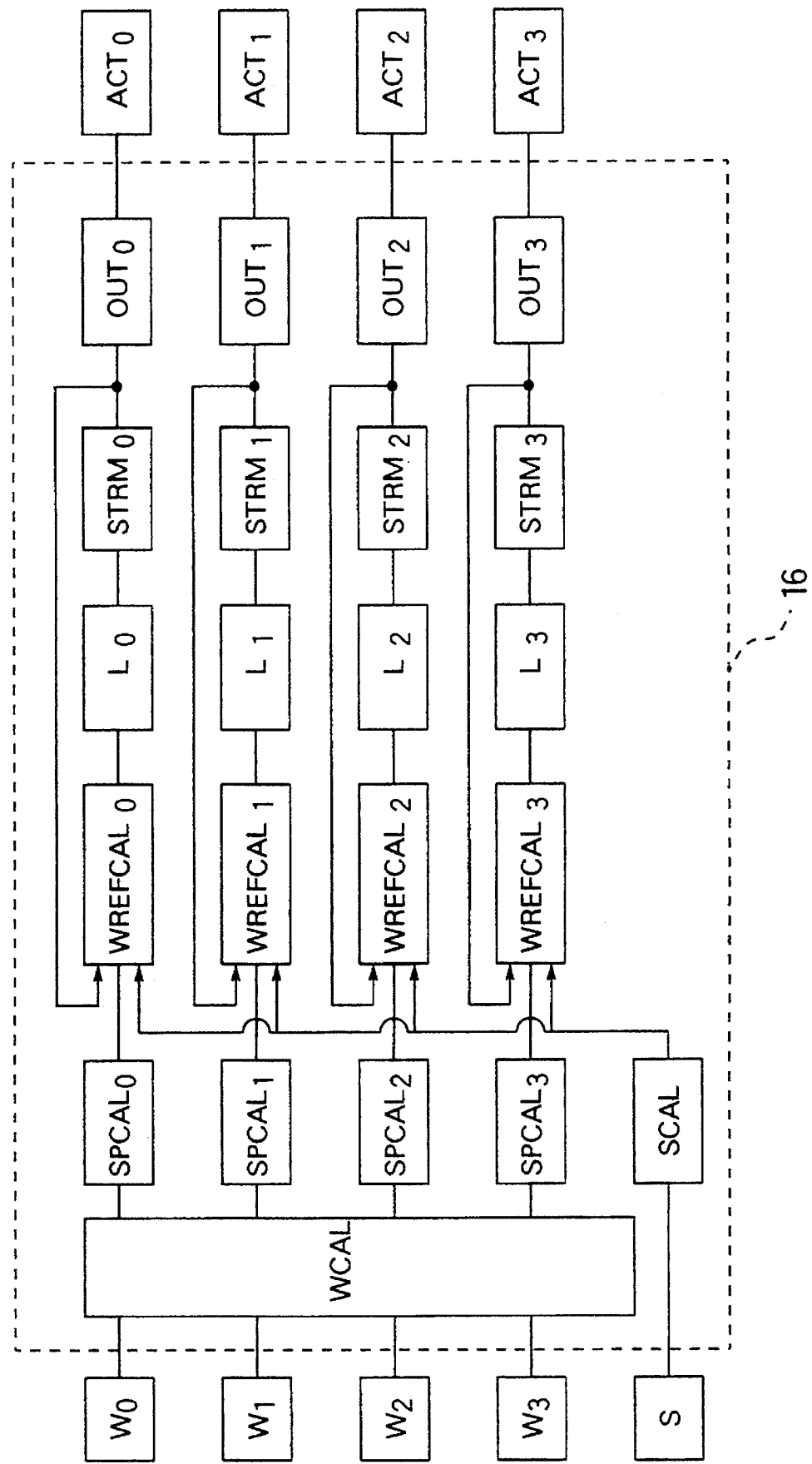
FIG. 10 is a schematic block diagram showing a second embodiment of the present invention.

FIG. 10 indicates a second embodiment of the present invention.

In the second embodiment, when a road surface friction coefficient is large different on the right side and the left side of the vehicle (split road surface), a controlling operation (split controlling operation) sets the estimated vehicle body speed $WREF_i$ on the high μ road surface side greater than the estimated vehicle body speed $WREF_i$ on the low μ road surface side.

In FIG. 10, $SPCAL_0$ through $SPCAL_3$ are a split detecting means. The split detecting means $SPCAL_0$ through $SPCAL_3$ calculate a split index indicating an extent of difference of the road surface friction coefficient between the high μ road surface side and the low μ road surface side so as to output a split index SPLIT to the estimated vehicle body speed calculating means $WREFCAL_i$.

In a second embodiment, lock symptom detecting means $L_0$, $L_1$, corresponding to right and left front driving wheels, are provided with split timers $SPLTMR_0$ and $SPLTMR_1$ for measuring a period of time when the skid condition of the namely, for a period of time when the above described skid flags $SKDFLG_0$, $SKDFLG_1$ continue in the "1" condition.

The remaining elements in the second embodiment is the same as that in first embodiment.

The operation of the second embodiment shown in FIG. 11 will be described hereinafter.

Figure 11:
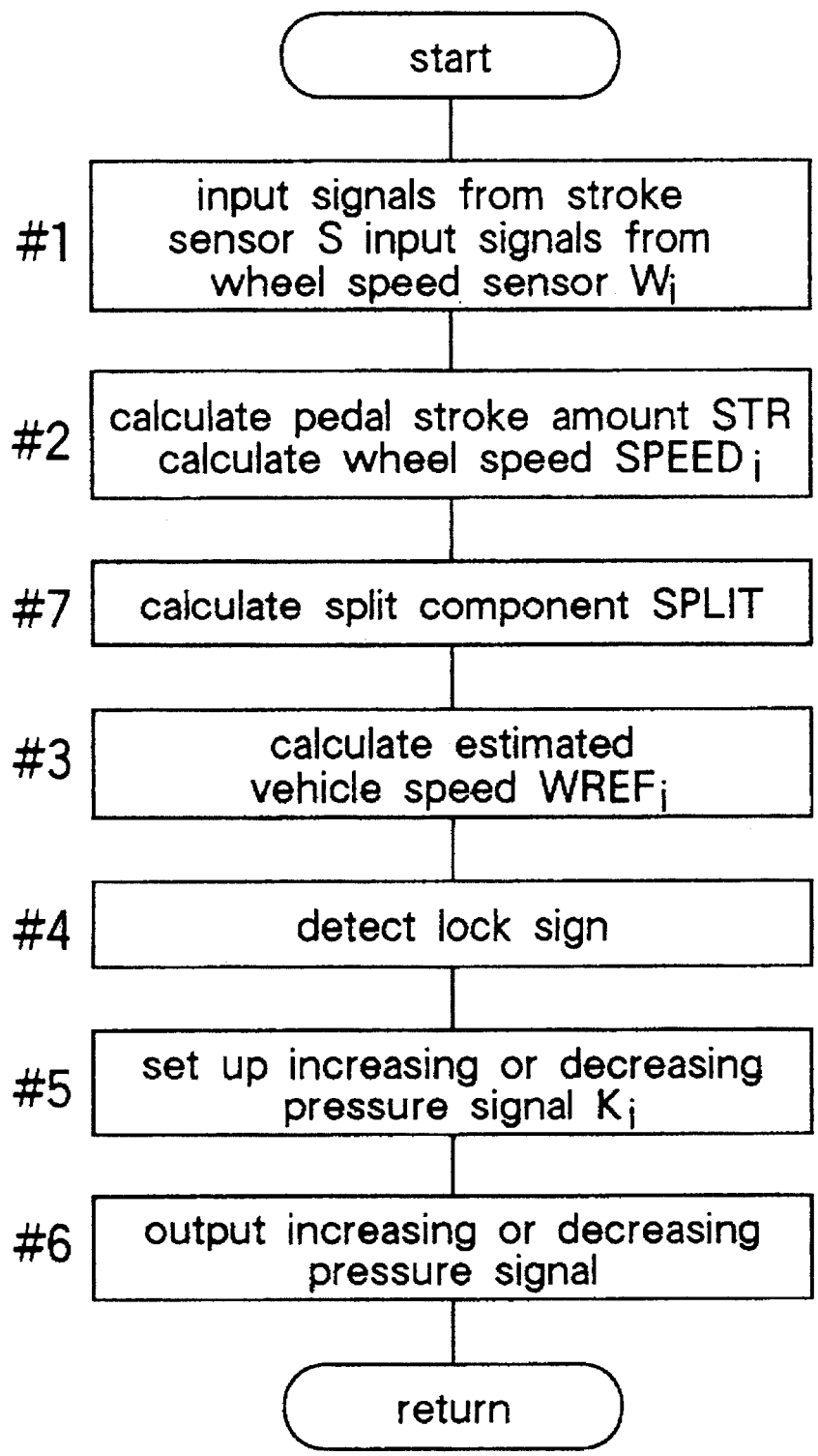
FIG. 11 is a flow chart showing an operation in a second embodiment.

At the step #1, and the step #2 in FIG. 11, signals from the wheel speed detecting means $W_0$ through $W_3$, and the pedal stroke quantity detecting means S are input as in the first embodiment to calculate the wheel speed $SPEED_i$ and the pedal stroke quantity STR.

A split index SPLIT is calculated at a step #7.

Figure 12:
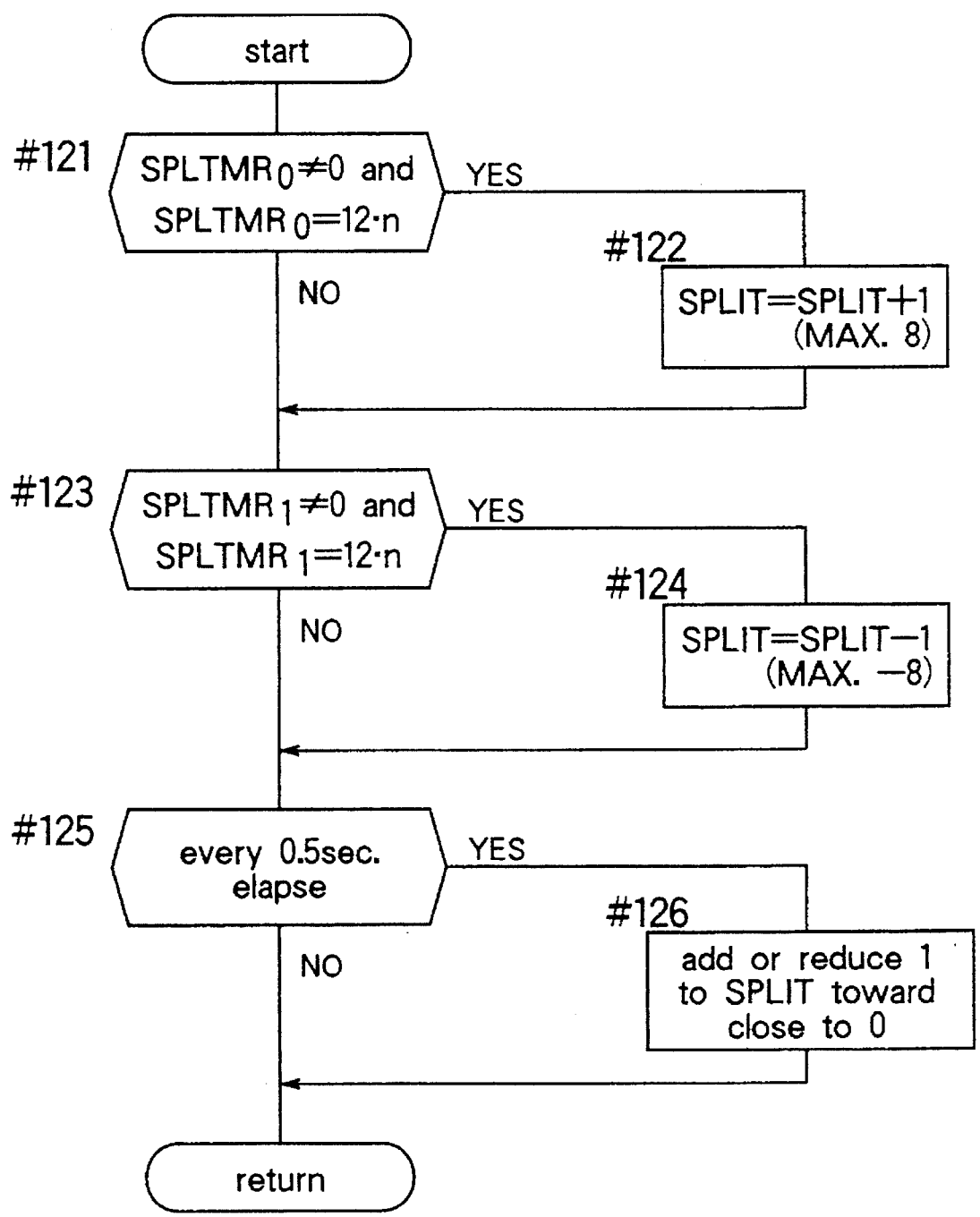
FIG. 12 is a flow chart showing the details of a step #7 of FIG. 11.

At the step #7, a processing operation shown in FIG. 12 is effected in detail.

At a step #121 in FIG. 12, the above described split timer $SPLTMR_0$ corresponding to the left front wheel (i=0) checks whether or not it is a multiple of 12. Namely, if $SPLTMR_0 \neq 0$, and $SPLTMR_0 = 12 \cdot n$ (n is a natural number), "1" is added to the split index SPLIT at a step #122. A maximum value of the split index SPLIT is 8. As the control cycle is 8 msec, "1" is added to the split index SPLIT for approximately every 100 msec measured by the split timer $SPLITMR_0$ of the left front wheel.

At a step #123, if $SPLTMR_1 = 0$, and $SPLTMR_1 \neq 12 \cdot n$ about the split timer $SPLTMR_1$ corresponding to the right front wheel (i=1), "1" is reduced in the split index SPLIT at a step #124. A minimum value of the split index SPLIT is −8.

At a step #125 and a step #126, "1" is added or subtracted each 0.5 sec to bring split index SPLIT to 0.

The split index SPLIT set as described hereinabove changes during $-8 \leq SPLIT \leq 8$, indicates that the right side is on a low μ road surface as it is closer to the "−8" and the left side is on a low μ road surface as it is closer to the "8".

Figure 13:
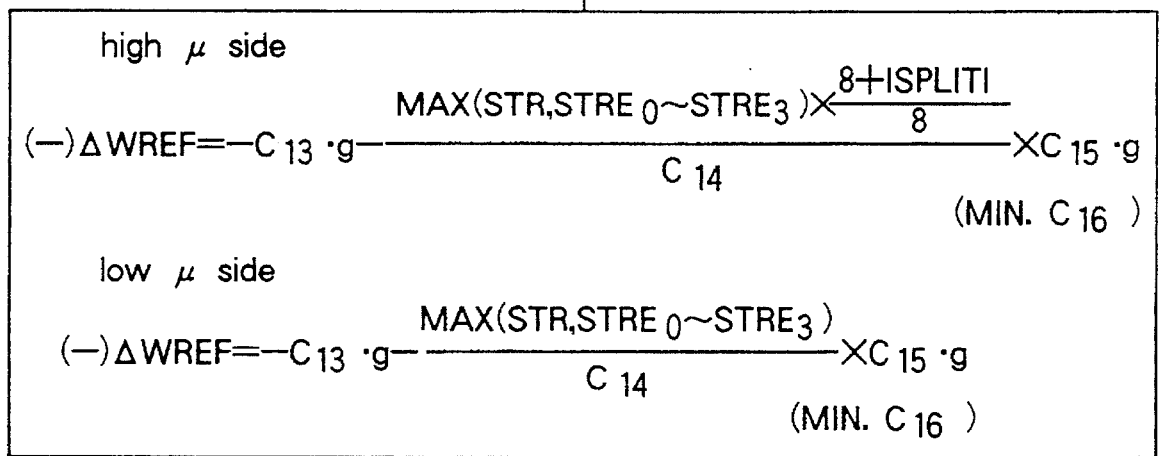
FIG. 13 is a partial view of a flow chart showing the second embodiment.

At the step #3 in FIG. 11, the estimated vehicle body speed $WREF_i$ is calculated. In second embodiment, the step 42 in FIG. 4 is replaced by a step #131 shown in FIG. 13.

Namely, in the second embodiment, the maximum descent speed (−) $\Delta WREF_i$ is set by the following equation (10) on the high μ road surface side of the right wheels (i=0, 2) on the low μ road surface side, the maximum descent speed $(-) \Delta WREF_i$ is set by the following equation (11) for the left wheels (i=1,3).

$$(-) \Delta WREF_i = \qquad (10)$$
$$-C_{13} \cdot g - \{MAX\ (STR, STRE_0\ \text{through}\ STRE_3) \times$$
$$(8 + |SPLIT|)/8\}/C_{14} \times C_{15} \cdot g\ (MIN.\ C_{16})$$

$$(-) \Delta WREF_i = \qquad (11)$$
$$-C_{13} \cdot g - \{MAX\ (STR, STRE_0\ \text{through}\ STRE_3)\}/C_{14} \times$$
$$C_{15} \cdot g\ (Min.\ C_{16})$$

In the above described equation (10) and equation (11), reference characters $C_{13}, C_{14}, C_{15}, C_{16}$ are constants fixed in accordance with the brake characteristics. In the second embodiments, $C_{13}=0.3$, $C_{14}=80$, $C_{15}=0.9$, $C_{16}=-1.2$ g are set.

The estimated vehicle body speed $WREF_i$ is calculated as in the first embodiment from the step #43 through the step #49 in FIG. 4.

Namely, in the second embodiment, when the road surface μ different between the right and left sides of a vehicle, the maximum descent speed $(-) \Delta WREF_i$ on the high μ road surface side is set greater than the low μ road surface side. In the second embodiment, the estimated vehicle body speed $WREF_i$ can be properly set in accordance with the road surface friction estimated by the pedal stroke quantity even in the split road surface.

At the step #4 in FIG. 11, the lock symptom is detected as in the first embodiment. Simultaneously, the continuous time of the skid condition in the right, left front wheel (i =0, 1) is measured by the split timer $SPLTMR_i$.

Figure 14A:
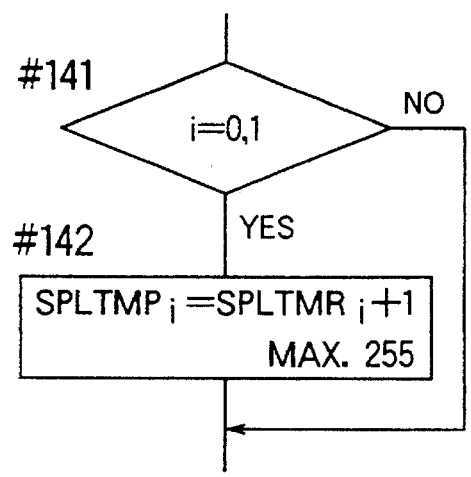
FIG. 14(A) and FIG. 14(B) are respectively partial views of a flow chart showing the second embodiment.
Figure 14B:
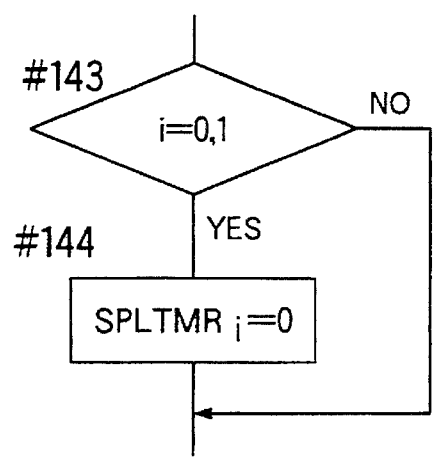

Namely, in the second embodiment, a processing operation shown in FIG. 14(A) is inserted into a portion S1 in FIG. 6 and also, a processing operation shown in FIG. 14(B) is inserted into a portion S2 in FIG. 6. At the step #68 in FIG. 6, the step moves to a step #141 when the skid flag $SKDFLG_i$ indicates "1" showing the skid condition. At the step #141, i=0, 1, namely, the wheel is a left front wheel or a right front wheel, "1" is added to the split timer $SPLTMR_i$ at a step #142. If the skid flag $SKDFLT_i$ is "0" at the step #68, the step moves to a step #143, where the step timer $SPLTMR_i$ is cleared into "0" at the step #144 if i=0, 1. In the present embodiment, the maximum value of the split timer $SPLTMR_i$ is set to 255.

At the step #5, and the step #6, a setting output operation of the pressure regulating signal $K_i$ to the actuators $ACT_i$ overperformed.

Figure 15:
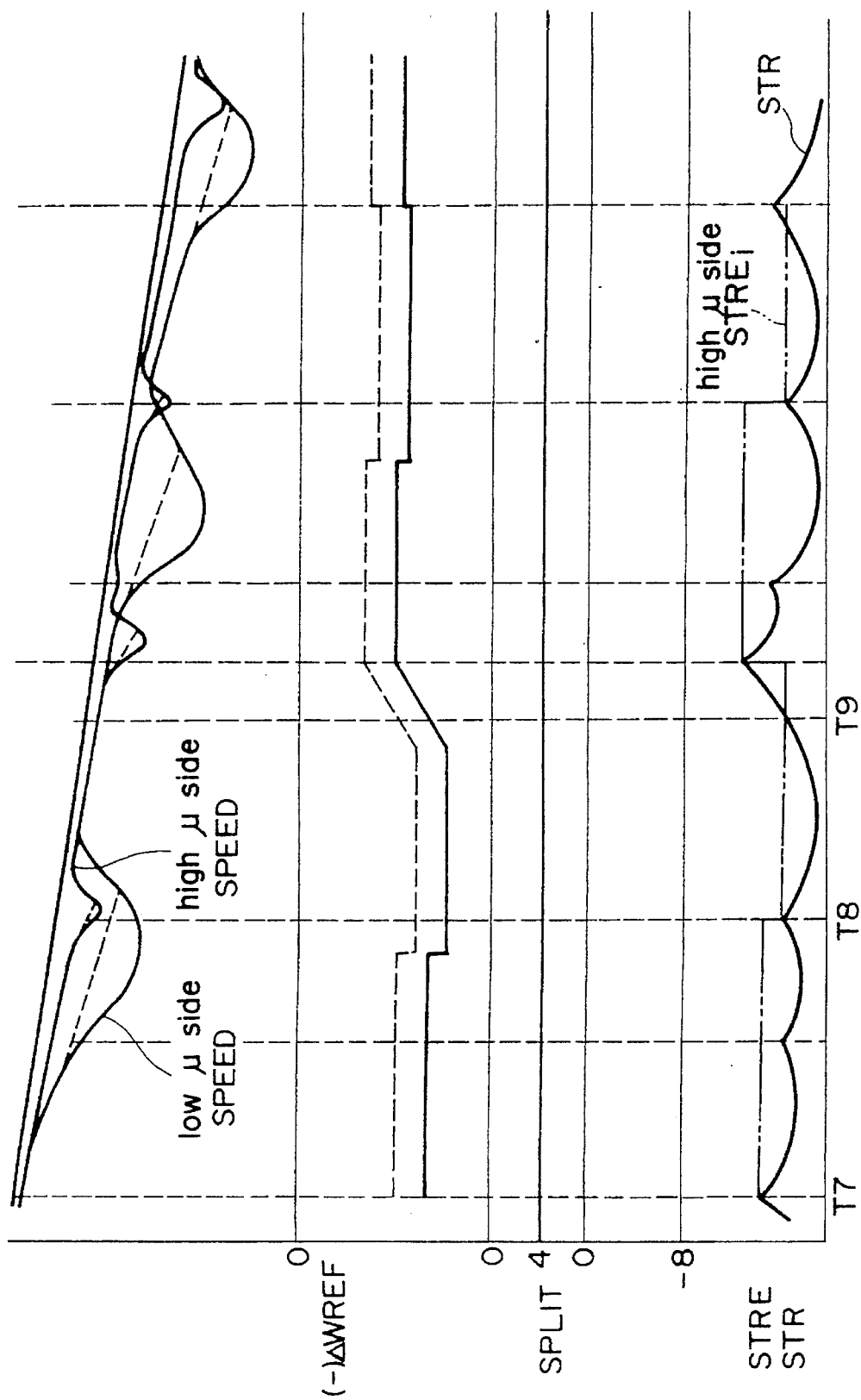
FIG. 15 is a block diagram showing one example of an operation of the second embodiment.

FIG. 15 shows "4" in the split index SPLIT, namely, an operation in the second embodiment on the split road surface where the left side of the vehicle is a low μ road surface and the right side is a high μ road surface.

When the lock symptom is detected at a time T7, the pedal stroke quantity STR at a time point is stored as $STRE_i$ to a pedal stroke quantity storing means $STRM_i$.

As the pedal stroke quantity $STRE_i$ at the above described time T7 exceeds the pedal stroke quantity STR at each control cycle for a period of time from a time T7 to a time T8, the maximum descent speed $(-) WREF_i$ is calculated in accordance with the equations (10), (11) from the $STRE_i$ and the split index SPLIT. As clear from the equations (10), (11) at this time, the maximum descent speed $(-) \Delta WREF_i$ on the high μ road surface side is larger than the low μ road surface side. In the second embodiment, the detection of the lock symptom using the $WREF_i$ and the detection of the recovery of the synchronization condition can be effected with high accuracy, because the estimated vehicle body speed $WREF_i$ becomes a value corrected in accordance with the right, left road surfaces μ.

When the lock symptom is detected again at the time T8, the pedal stroke quantity STR at this time T8 is stored in the pedal stroke quantity storing means $STRM_i$.

For a period of time from a time T8 to a time T9, the pedal stroke quantity $STRE_i$ stored in the pedal stroke quantity storing means $STRM_i$ is greater than the pedal stroke quantity STR at each control cycle, and the maximum descent speed $(-) \Delta WREF_i$ is set in accordance with the pedal stroke quantity "$STRE_i$. When, at a time T9, the pedal stroke quantity STR exceeds the pedal stroke quantity at the above described time T8, the maximum descent speed $-\Delta WREF_i$ is set later in accordance with the pedal stroke quantity STR at each control cycle.

A third embodiment of the present invention will be described hereinafter.

In the third embodiment, the estimated vehicle body speed $WREF_i$ is adapted to be set correspondingly when the vehicle is turning on a corner.

Figure 16A:
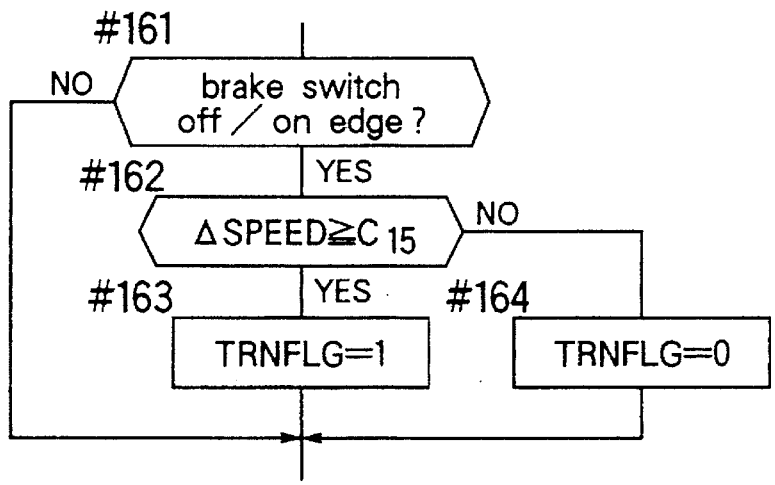
FIG. 16(A) and FIG. 16(B) are respectively partial views of a flow chart showing a third embodiment of the present invention.

In the third embodiment, a brake switch (not shown) is provided. It outputs "ON" when a brake pedal 14 is depressed, and "OFF" when the brake pedal 14 is not depressed. A signal from the brake switch is input to a signal processing portion 16. In the third embodiment, a processing operation, shown in FIG. 16(A), is inserted into a portion S3 of FIG. 4. In addition, a processing operation of the step #42 is replaced by a processing operation shown in FIG. 16(B). The other construction of the third embodiment is similar to that of the first embodiment.

In the third embodiment, the estimated vehicle body speed $WREF_i$ is calculated as described hereinabove.

At a step #161 of FIG. 16(A), it is checked whether or not the control cycle at this time is off/on edge where the brake switch is switched from the off to on, to move the step to a step #162 in the case of the on/off edge.

At the step #162, the ΔSPEED is compared with a given value $C_{15}$ (km/h). The ΔSPEED is an absolute value of the speed difference of the right, left rear wheels, and is defined by the following equation (12).

$$\Delta SPEED = |SPEED_2 - SPEED_3| \qquad (12)$$

In the present embodiment, the above described given value $C_{15}$ is set to 2 km/h.

When the ΔSPEED is greater than the given value $C_{15}$ at the above described step #162, it is judged that the vehicle is turning. At a step #163, the turning flag TRNFLG is set to "1". When the ΔSPEED is smaller than the given value $C_{15}$ at a step #162, it is judged that the vehicle is not turning. The step moves to a step #164 so as to set the turning flag TRNFLG is set to "0".

Figure 16B:
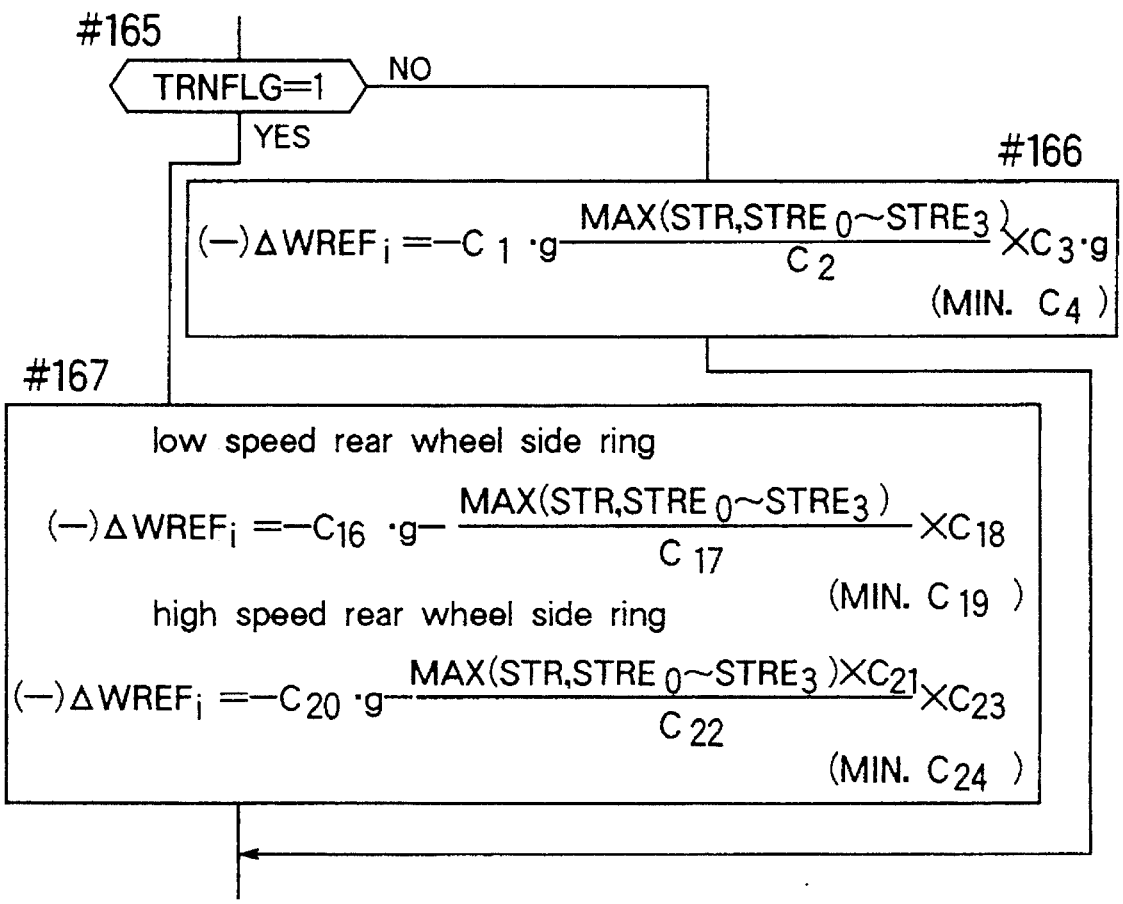

The maximum ascent speed (+) WREF is set as shown at a step #41 in FIG. 4, and thereafter, the step moves to a step #165 of FIG. 16(B).

At the step #165, the above described turning flag TRNFLG is checked. In the case of the "0", the maximum descent speed $(-) \Delta WREF_i$ is set by the equation (1) as in the first embodiment at the step #166.

If the turning flag TRNFLG is "1" at step #165, it is estimated that the vehicle is turning and a braking operation is effected by a brake, and the step moves to a step #167.

At a step #167, four wheels of a vehicle are divided into front, rear wheels on a right side (i=0, 2) and front, rear wheels (i=1, 3) on a left side. Of them, a maximum descent speed $(-) \Delta WREF_i$ of a wheel on a side same as a low speed rear wheel is regulated by the following equation (13), and a $(-) \Delta WREF_i$ of a wheel on the side same as that of a high speed rear wheel is regulated by the following equation (14).

$$(-) \Delta WREF_i = \qquad (13)$$

$$-C_{16} \cdot g - \{MAX\ (STR,\ STRE_0\ \text{through}\ STRE_3)/C_{17}\} \times$$
$$C_{18} \cdot g\ (MIN.\ C_{19})$$

$$(-) \Delta WREF_i = \qquad (14)$$

$$-C_{20} \cdot g - \{MAX\ (STR,\ STRE_0\ \text{through}\ STRE_3) \times C_{21}/C_{22}\} \times$$
$$C_{23} \cdot g\ (MIN.\ C_{24})$$

Of both the right, left sides of the vehicle, the low speed side corresponds to the inner side (inner wheel side) of a turning radius of the vehicle and the high speed side corresponds to the outer side (outer wheel side) of the turning radius of the vehicle.

Of the above described equations (13), (14), reference characters $C_{16}$ through $C_{24}$ are constants to be determined in accordance with the brake characteristic of the vehicle. In the present embodiment, $C_{16}$, $C_{20}$=0.3, $C_{17}$, $C_{22}$= 80, $C_{18}$, $C_{23}$=0.9, $C_{19}$, $C_{24}$=− 1.2 g, $C_{21}$=1.5 are set. In the third embodiment as described hereinabove, the pedal stroke quantity STR is increased by 50% on the high speed rear wheel side so as to calculate the maximum descent speed (−) $WREF_i$.

In the third embodiment, as the maximum descent speed of the estimated vehicle body speed $WREF_i$ differs on the high speed side and the low speed side of the turning vehicle, an ideal anti-lock controlling operation can be effected even with respect to the turning vehicle.

At the above described step #167, the maximum descent speed (−) $\Delta WREF_i$ of a wheel on the same side as the high speed rear wheel may be set in accordance with the wheel reduced speed Vg. For example, the maximum descent speed (−) $\Delta WREF_i$ of the wheel on the same side as the high speed rear wheel may be set by the following equation (15)

$$(-) \Delta WREF_i = -C_{25} \cdot g - \{(1+Vg) \times STR/C_{26}\} \times C_{27} \cdot g$$
$$(MIN.\ C_{28}) \qquad (15)$$

In the equation (15), $C_{25}$, $C_{26}$, $C_{27}$, $C_{28}$ are constants determined in accordance with the brake characteristics. For example, $C_{25}$=0.3, $C_{26}$=80, $C_{27}$=0.9, $C_{28}$=−1.2 are set. In the equation (15), the unit of g is a gravity acceleration.

A fourth embodiment of the present invention will be described hereinafter.

Figure 17:
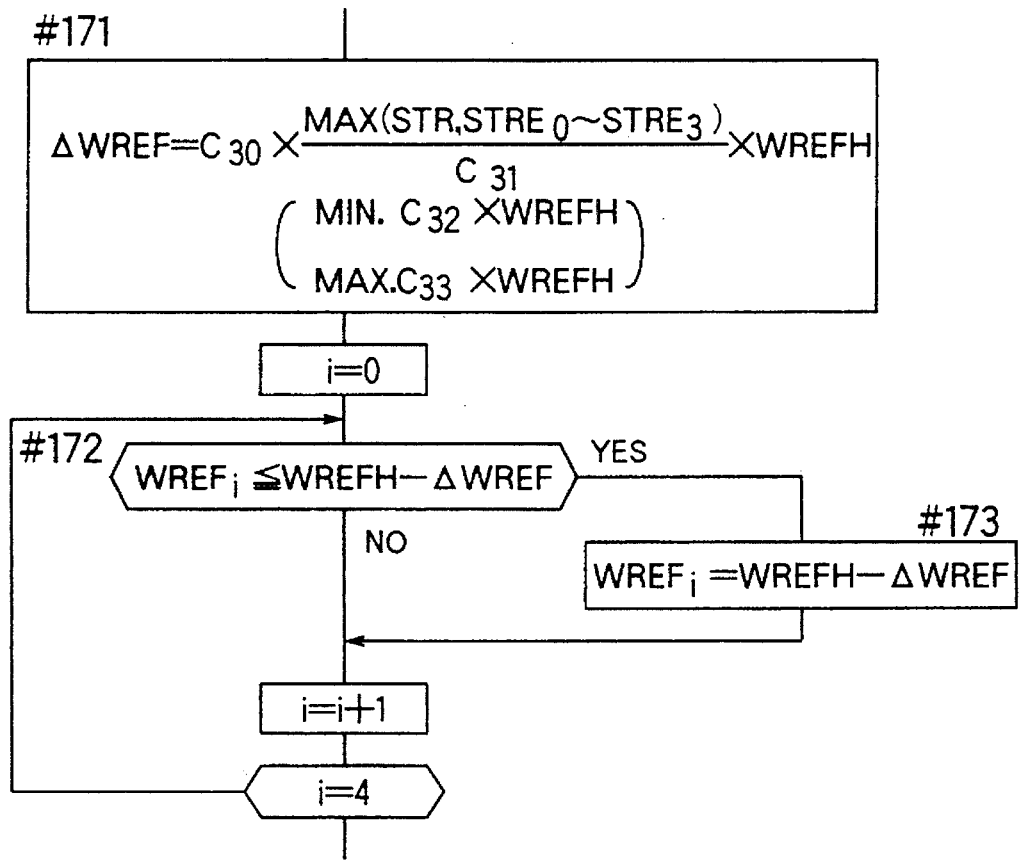
FIG. 17 is a partial view of a flow chart showing a fourth embodiment of the present invention.

In the fourth embodiment, a processing operation shown in FIG. 17 is effected in a portion S4 in FIG. 4. The other elements and operations will be the same as those of the first embodiment.

In the fourth embodiment, estimated vehicle body speed $WREF_0$ through $WREF_3$, corresponding to each wheel, and the maximum estimated vehicle body speed WREFH are calculated at steps #41 through #50 in FIG. 4. Thereafter, the step moves to a step #171 in FIG. 17.

At a step #171, a maximum deviation quantity ΔWREFH is obtained. The maximum deviation quantity ΔWREF stipulates a maximum value of the deviation between the above described maximum estimated vehicle body speed WREF and the estimated vehicle body speed $WREF_i$ corresponding to each wheel, and is concretely calculated by the following equation (16).

$$\Delta WREF = \qquad (16)$$
$$C_{30} \times MAX\ (STR,\ STRE_0\ \text{through}\ STREF_3)/C_{31} \times WREFH$$
$$(MIN.\ C_{32} \cdot WREFH)$$
$$(MAX.\ C_{33} \cdot WREFH)$$

In the above described equation (16), $C_{30}$ through $C_{33}$ are constants to be set in accordance with brake characteristics. In the fourth embodiment, $C_{30}$=0.3, $C_{31}$=80, $C_{32}$=0.1, $C_{33}$=0.3.

Figure 18:
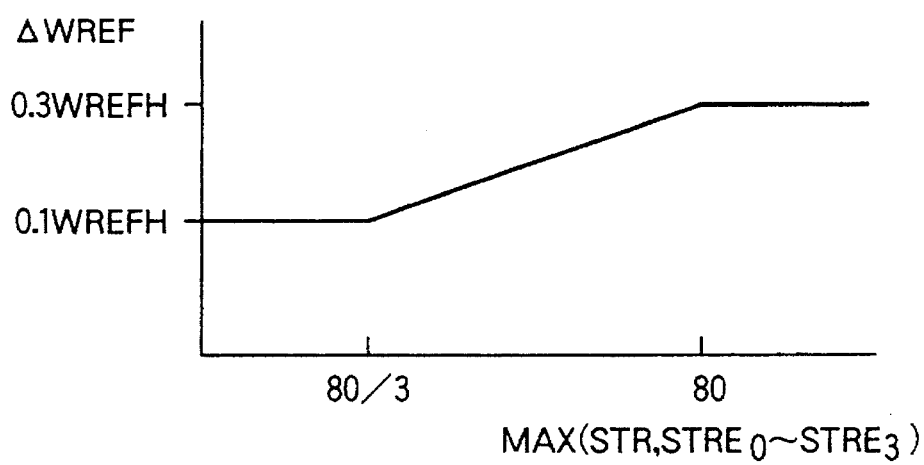
FIG. 18 is a block diagram showing the relation between a pedal stroke and a deviation quantity.

FIG. 18 indicates the relation between the maximum deviation equation ΔWREF and the pedal stroke quantity in a case where $C_{30}$ through $C_{33}$ are set to above described values.

When a larger of the pedal stroke quantity STR at each control cycle and the pedal stroke quantity $STRE_0$ through $STRE_3$ at the starting time of the skid cycle, namely, a MAX (STR, $STRE_0$ through $STRE_3$) are lower than 80/3 mm, the maximum deviation quantity ΔWREF is set to 0.1•WREFH. The maximum deviation equation ΔWREF is proportional proportion to the pedal stroke quantity while the MAX. (STR, $STRE_0$ through $STRE_3$) is between 80/3 mm and 80 mm. Further, when the MAX (STR, $STRE_0$ through $STRE_3$) exceeds 80 mm, the maximum deviation equation ΔWREF is set to 0.3•WREFH.

At a step #172, the estimated vehicle body speed $WREF_i$ of each wheel is compared with the maximum deviation quantity ΔWREF subtracted from the maximum value WREFH of the estimated vehicle body speed (WREFH−ΔWREF). If the estimated vehicle body speed $WREF_i$ is smaller, the $WREF_i$ is set to the estimated vehicle body speed WREFH−ΔWREF at a step #173.

In the fourth embodiment, the maximum deviation quantity ΔWREF is set in accordance with the pedal stroke quantity as described hereinabove. The value obtained by subtraction of the maximum deviation quantity ΔWREF from the maximum vehicle body speed WREFH is provided as a bottom value of the estimated vehicle body speed $WREF_i$.

In the fourth embodiment, when there is a great difference between the maximum estimated vehicle body speed and the estimated vehicle body speed at the position of a wheel, it is adapted to be corrected. Thus, the anti-lock control operation can be effected with high accuracy even when the vehicle body speed is large dispersed.

In the equations (10), (11), (13), (14), (16) from the second embodiment to the fourth embodiment, MAX (STR, $STRE_0$ through $STRE_3$) is permuted to STR, and the pedal stroke quantity STR at each control cycle may be used as it is without comparison between the pedal stroke quantity at the lock symptom detection edge and the pedal stroke quantity STR in each control cycle.

Figure 19:
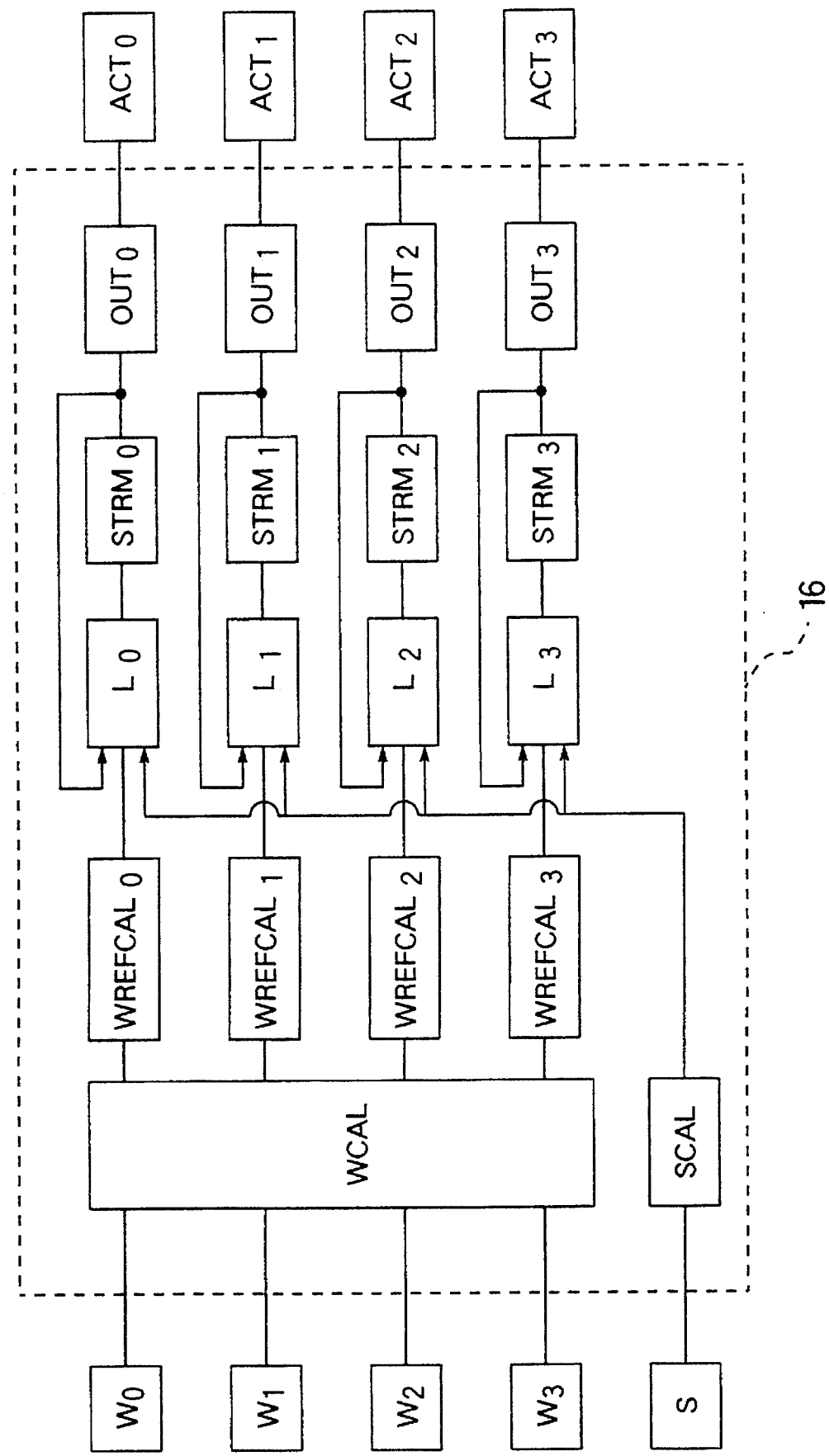
FIG. 19 is a schematic block diagram showing a fifth embodiment of the present invention.

A fifth embodiment of the present invention shown in FIG. 19 will be described hereinafter.

Figure 20A:
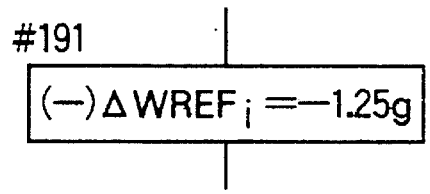
FIG. 20(A) and FIG. 20(B) are respectively partial views of a flow chart showing the fifth embodiment.
Figure 20B:
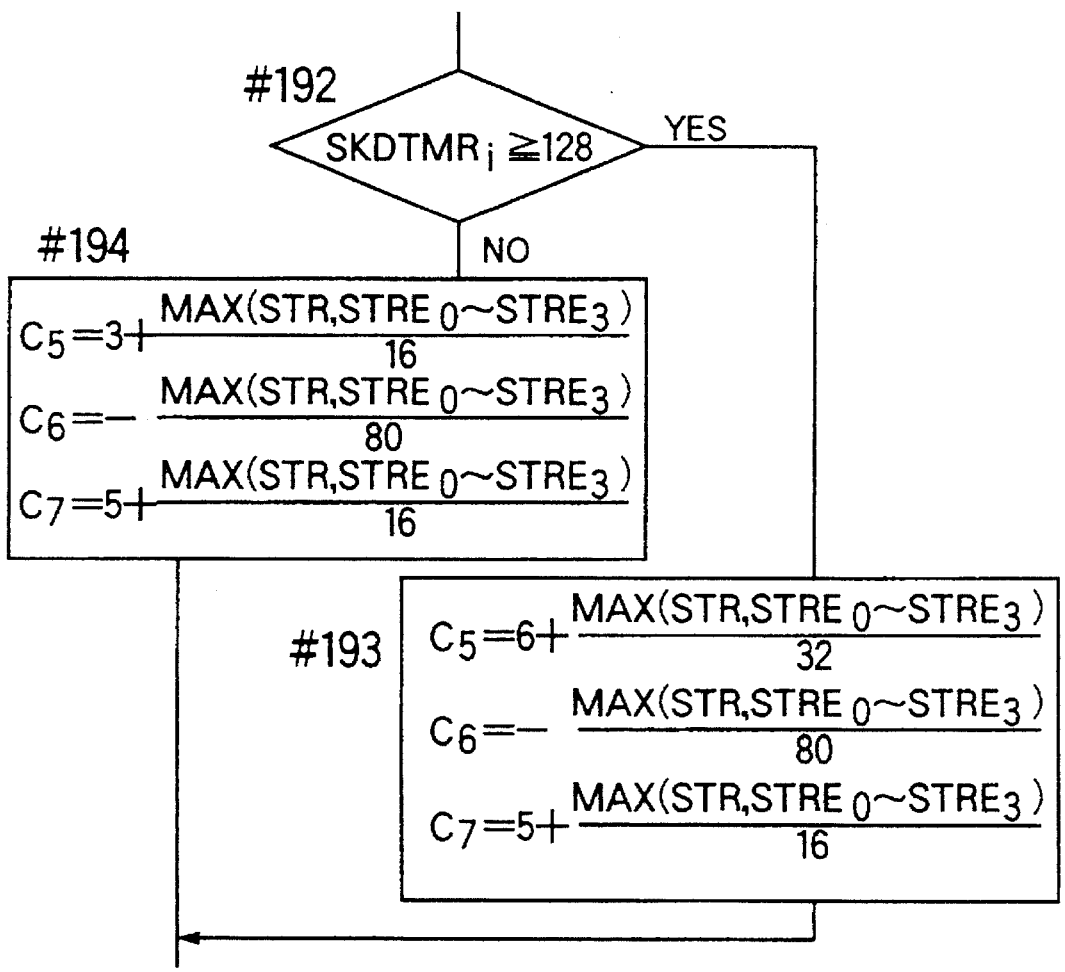

In the fifth embodiment, a signal from the above described pedal stroke quantity detecting means S is adapted to be output to each lock symptom detecting means $L_0$ through $L_3$. The fifth embodiment is similar in construction to the first embodiment except in that a step #42 in FIG. 4 is replaced by the step #191 shown in FIG. 20(A). In addition, a processing operation shown in FIG. 20(B) is inserted into a portion S5 of FIG. 6, showing the detection of the lock symptom.

In the fifth embodiment, the pedal stroke quantity STR and the wheel speed signal $SPEED_i$ are calculated at step #1 and step #2 as shown in FIG. 3. The estimated vehicle body speed $WREF_i$ is calculated at the step #3. At this time, the maximum descent speed (−) $\Delta WREF_i$ is set to a constant value as shown in step #191.

The detection of the lock symptom is effected at the step #4 in FIG. 3.

In the first embodiment in FIG. 6 showing the detection of the lock symptom, threshold values $C_5$, $C_6$, $C_7$ are made constant in the equations (2) and the equation (3) at the step #61. In the fifth embodiment, the value is adapted to be changed in accordance with the pedal stroke quantity.

The value of the skid timer $SKDTMR_i$ is checked at the step #192 of FIG. 20(B). If the value is 128 or more, it is judged that the operation is under a non-anti-lock controlling operation, and control moves the step to a step #193. If the value is smaller than 128, it is judged that the operation is under an anti-lock controlling operation so as to move the step to a step #194.

At a step #193, the values of the threshold values $C_5$, $C_6$, $C_7$ are set as described hereinafter.

$C_5 = 6 + $ MAX (STR, $STRE_0$ through $STRE_3$)/32
$C_6 = -$MAX (STR, $STRE_0$ through $STRE_3$)/80
$C_7 = 5 + $ MAX (STR, $STRE_0$ through $STRE_3$)/16

At a step #194, the values of the threshold values $C_5$, $C_6$, $C_7$ are set as described hereinafter.

$C_5 = 3 + $ MAX (STR, $STRE_0$ through $STRE_3$)/16
$C_6 = -$MAX (STR, $STRE_0$ through $STRE_3$)/80
$C_7 = 5 + $ MAX (STR, $STRE_0$ through $STRE_3$)/16

Namely, in the fifth embodiment, the sensitivity for detecting the lock symptom is set so that as a larger one of the pedal stroke quantity STR in each control cycle and the pedal stroke quantity $STRE_i$ at the lock symptom detection edge becomes, greater the duller the lock symptom detection sensitivity becomes, and the smaller it becomes. Similarly the more sensitive the lock symptom detection sensitivity becomes.

The greater the pedal stroke quantity STR or the pedal stroke quantity $STRE_i$ at the lock symptom detection edge becomes, the higher the road surface μ becomes. Conversely, the smaller it is, the lower the road surface is. When the threshold values $C_5$, $C_6$, $C_7$ are set as described hereinabove, the lower the road surface μ is, the more sensitive the lock symptom detection sensitivity becomes.

After the threshold values $C_5$, $C_6$, $C_7$ have been set as described hereinabove, the detection of the lock symptom at the step #61 through step #73 proceeds as in the first embodiment, and the processing operation of the skid flag $SKDFLG_i$ and the skid timer $SKDTMR_i$ are effected.

The threshold value $C_5$ is set at steps #193 and #194 differs because (a) an item for MAX (STR, $STRE_0$ through $STRE_3$) is made small at a step #193, corresponding before the anti-lock control operation, to prevent dispersion caused by the fast and slow stepping motion of the above described brake pedal, and (b) the pedal stroke quantity $STR_i$ is different if the road surface μ is the same between fast stepping operation of the brake pedal and the slow stepping operation thereof before the anti-lock controlling start.

Although the setting and output of the pressure regulating signal $K_i$ are effected at the steps #5 and the step #6 in FIG. 3 after the lock symptom detecting operation, the processing operation is similar to that of the first embodiment.

Figure 21:
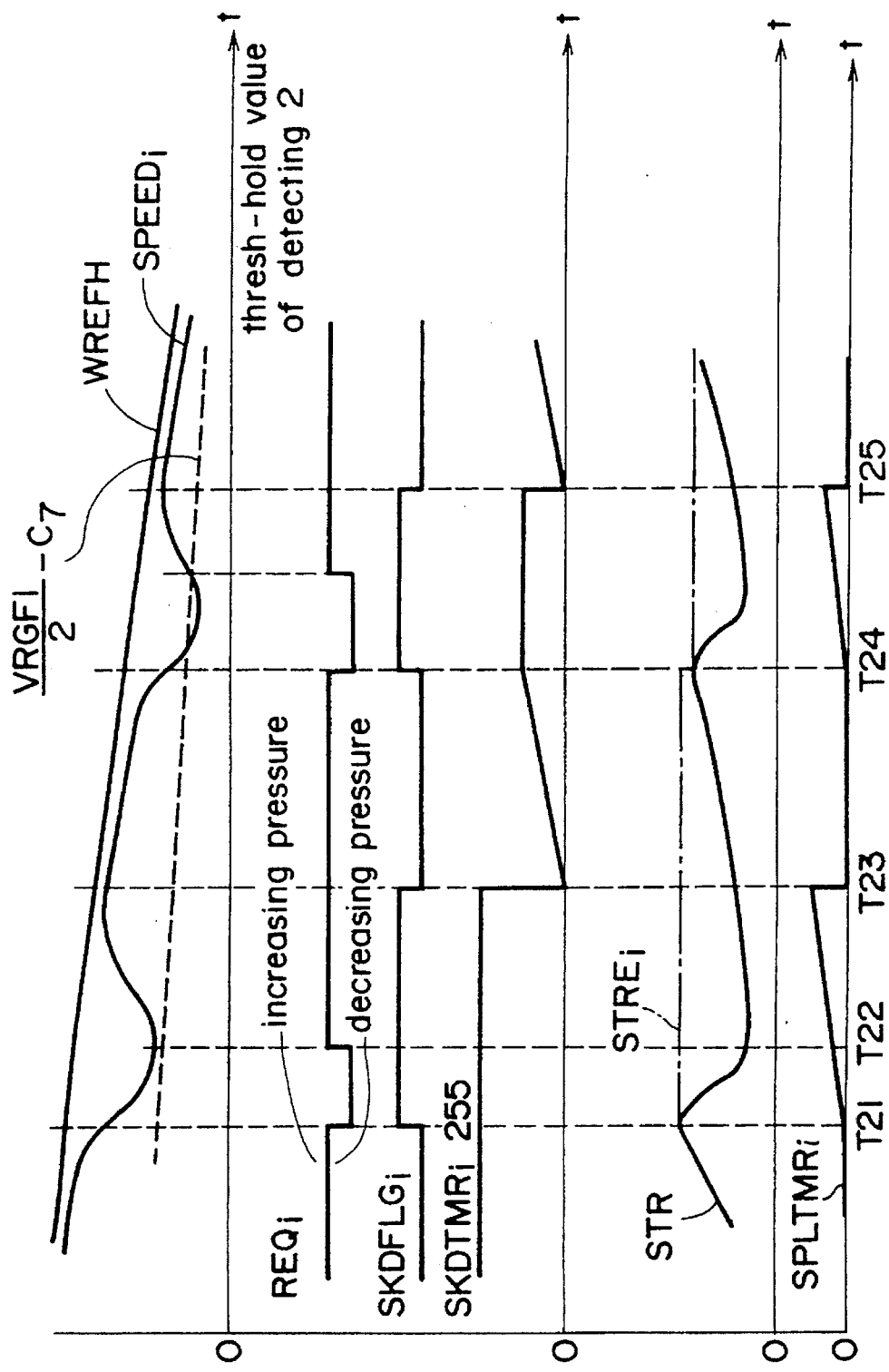
FIG. 21 is a schematic graph showing one example of an operation of the fifth embodiment.

FIG. 21 shows a position example of an operation in the fifth embodiment;

When a first lock symptom is detected at a time T21, a control request $REQ_i$ is set to "pressure reduction" and the skid flag $SKDFLG_i$ is set to "1". The pedal stroke quantity STR at this time is stored in the pedal stroke quantity storing means $STR_i$ as a pedal stroke quantity $STRE_i$ at the start time of the skid cycle.

At a time T22, the control request $REQ_i$ is set to "pressure increase."

When it is detected at a time T23 that the synchronization between the wheel speed $SPEED_I$ and the estimated vehicle body speed $WREF_i$ is recovering, the skid flag $SKDFLG_i$ is set to 0 and a skid timer $SKDTMR_I$ is cleared to "0."

For a period of time from a time T23 to a time T24, the lock symptom is not detected, and a non-anti-locking control operation is on. The control request $REQ_i$ is "pressure increase" and the skid flag $SKDFLG_i$ is set "0." During a period of time, "1" is added for each control cycle to the skid timer $SKDTMR_i$. In the skid flag $SKDFLG_i$, a second lock symptom is detected at a time T24 and the lock symptom is cleared to "0" at a time point when the lock symptom has been released at a time T25.

During a period from the above time T21 to the time T25, the threshold value $C_7$ of the above described equation (3) changes, and a threshold for the wheel speed $SPEED_i$ is shown with dotted lines in the drawings.

In the fifth embodiment, the lock symptom detecting sensitivity is adapted to be set with sensitivity as the value is smaller, namely, the road surface friction coefficient is smaller, considering a value of a larger one between a pedal stroke STR and a pedal stroke quantity $STRE_i$ at the lock symptom detecting edge in the detection sensitivity of the lock symptom as described hereinabove. Therefore, according to the fifth embodiment, excessive sinking with respect to the estimated vehicle body speed $WREF_i$ of the wheel speed SPEED $_i$ on the low μ road surface can be reduced as shown in FIG. 21, and an ideal anti-lock control operation can be effected.

In a fifth embodiment, in an equation where threshold values $C_5$, $C_6$, $C_7$ at steps #193, #194 in the above described FIG. 20(B) are set, MAX (STR, $STRE_0$ through $STRE_3$) is permuted to STR so as to set the detection sensitivity of the lock symptom detection edge in accordance with the pedal stroke quantity STR at each control cycle.

Figure 22:
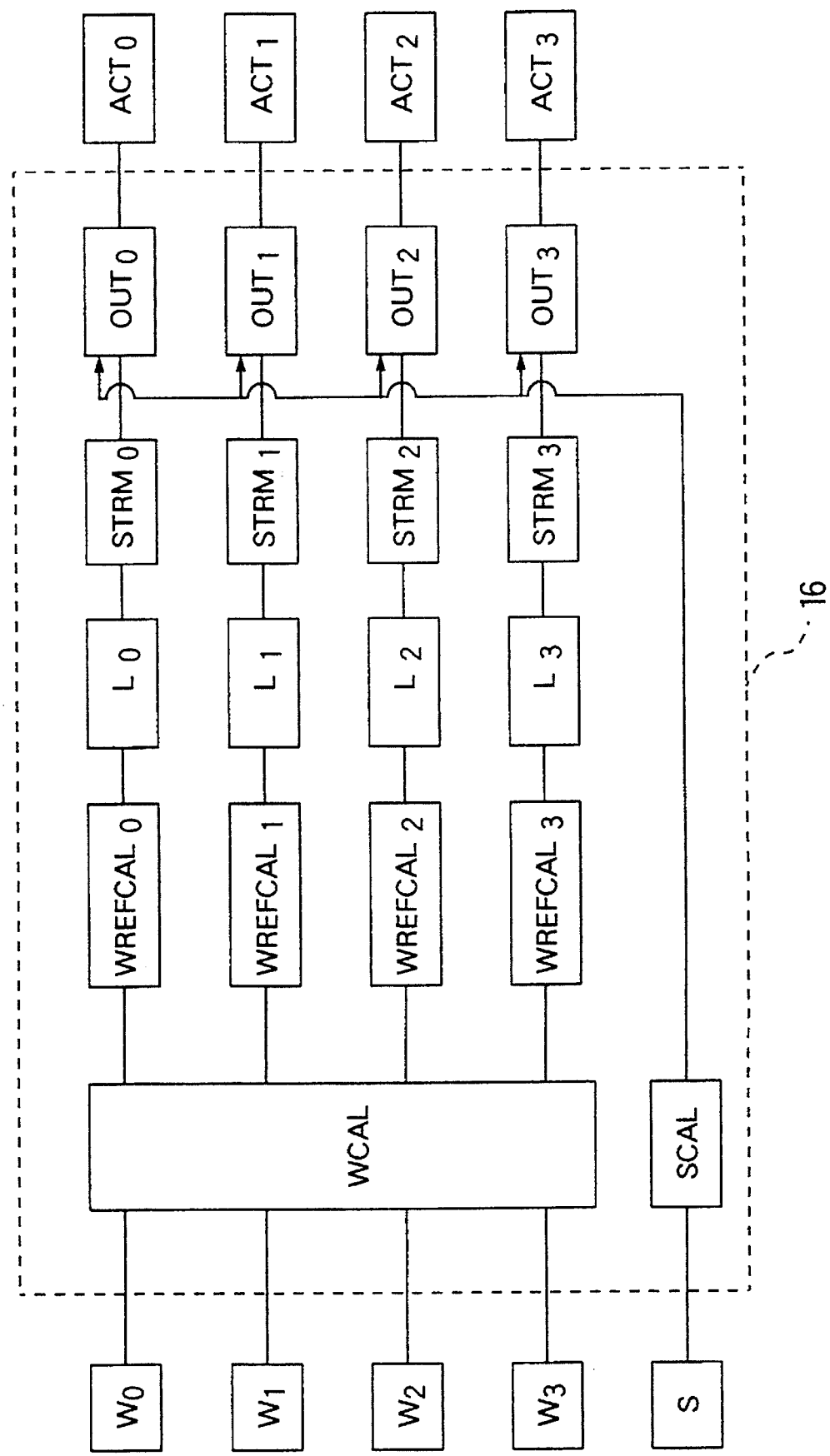
FIG. 22 is a schematic block diagram showing a sixth embodiment of the present invention.

A sixth embodiment of the present invention shown in FIG. 22 will be described hereinafter.

In the sixth embodiment, pedal stroke quantities $STRE_0$ through $STRE_3$ stored in the pedal stroke quantity signal STR and pedal stoke quantity storing means $STRM_0$ through $STRM_3$ are input into the pressure regulating signal setting means $OUT_0$ through $OUT_3$ to correct the pressure regulating signal $K_i$ in accordance with the pedal stroke quantity.

Figure 23:
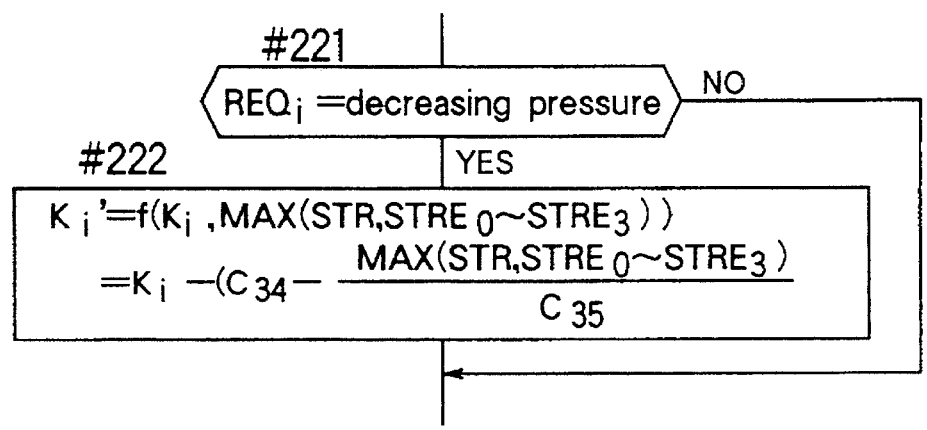
FIG. 23 is a partial view of a flow chart showing the sixth embodiment.

In the sixth embodiment, a function similar to FIG. 3 in the first embodiment is effected. FIG. 4, which indicates estimated vehicle body speed $WREF_i$ differs from the first embodiment in that step #42 is replaced by a step #191 shown in FIG. 20(A). In addition, a processing operation shown in FIG. 23 is inserted into a portion S6 of FIG. 7 showing the setting operation of the pressure regulating signal $K_i$.

In the sixth embodiment, the maximum descent speed (−) $\Delta WREF_i$ is set to −1.25 g.

In the sixth embodiment, as shown at the step #81 through the step #85 in FIG. 7, a pressure regulating signal $K_i$ is set from a wheel speed $SPEED_i$, a differential value d/dt (SPEEDi) and second differential $d^2/dt^2$ ($SPEED_i$). Thereafter, the control passes to a step #221 of FIG. 23.

At the step #221, the control request $REQ_i$ is checked so as to move to a step #222 in the case of "pressure reduction."

At the above described step #222, the pressure regulating signal $K_i$ is corrected by the following equation (17).

$$K_i = f(K_i, \text{MAX } (STR, STRE_0 \text{ through } STRE_3) = \qquad (17)$$

$$K_i - \{C_{34} - \text{MAX } (STR, STRE_0 \text{ through } STRE_3)/C_{35}\}$$

where $C_{34}$, $C_{35}$ are constants set in accordance with the brake characteristics, in the sixth embodiment, $C_{34}=6$, $C_{35}=10$.

Figure 24:
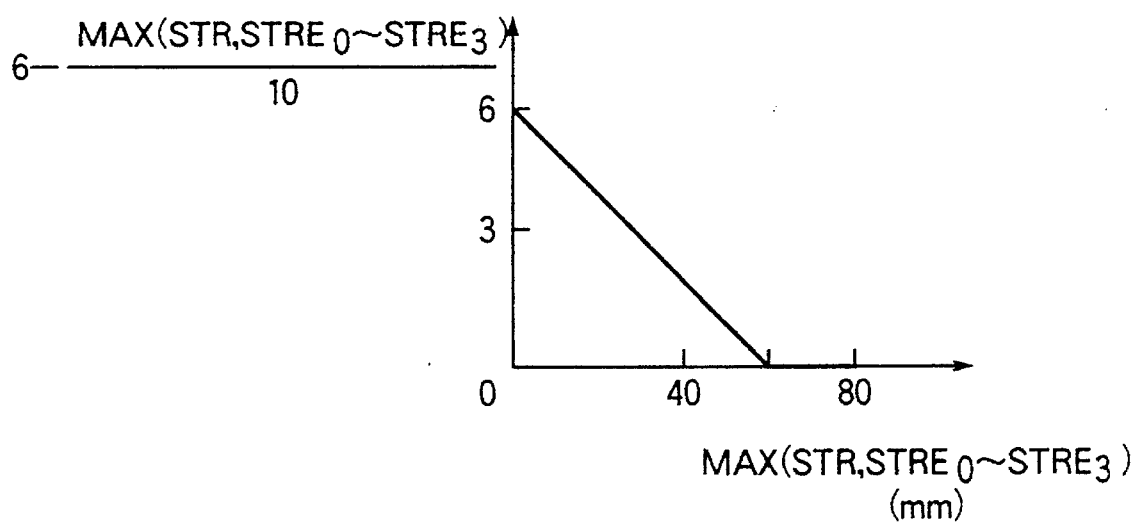
FIG. 24 is a block diagram showing the relation between the pedal stroke quantity and the correcting quantity.

FIG. 24 indicates the values for correcting the pedal stroke quantity STR or $STRE_i$ and pressure regulating signal $K_i$ when the constants $C_{34}$, $C_{35}$ have been set to the above described values, and indicates the relationship of $\{C_{34}-\text{MAX (STR, STRE}_0 \text{ through STRE}_3)/C_{35}\}$. As shown in FIG. 24, the correction quantity with respect to the original pressure regulating signal $K_i$ becomes smaller as the pedal stroke quantity STR or $\text{STRE}_i$ increases. As the larger of the above described pedal stroke quantities STR, $\text{STRE}_i$ becomes greater, the value of the pressure regulating signal $K'_i$ becomes greater.

As shown in Table 1, as pressure reduction signal $K_i$ increases to +8, the greater to the pressure reducing time $\Delta$tdump the pressuring increasing time $\Delta$tapply becomes in tendency. When the pressure reduction signal $K_i$ is corrected as in the sixth embodiment, the greater the pedal stroke quantity STR or $\text{STRE}_i$ becomes, namely, the greater the road surface friction coefficient $\mu$ becomes, the smaller the pressure reduction width becomes at one control cycle. Therefore, in the anti-lock controlling apparatus in the sixth embodiment, it prevents the excessive pressure reduction when the lock symptom has been caused on the high $\mu$ road surface.

Figure 25:
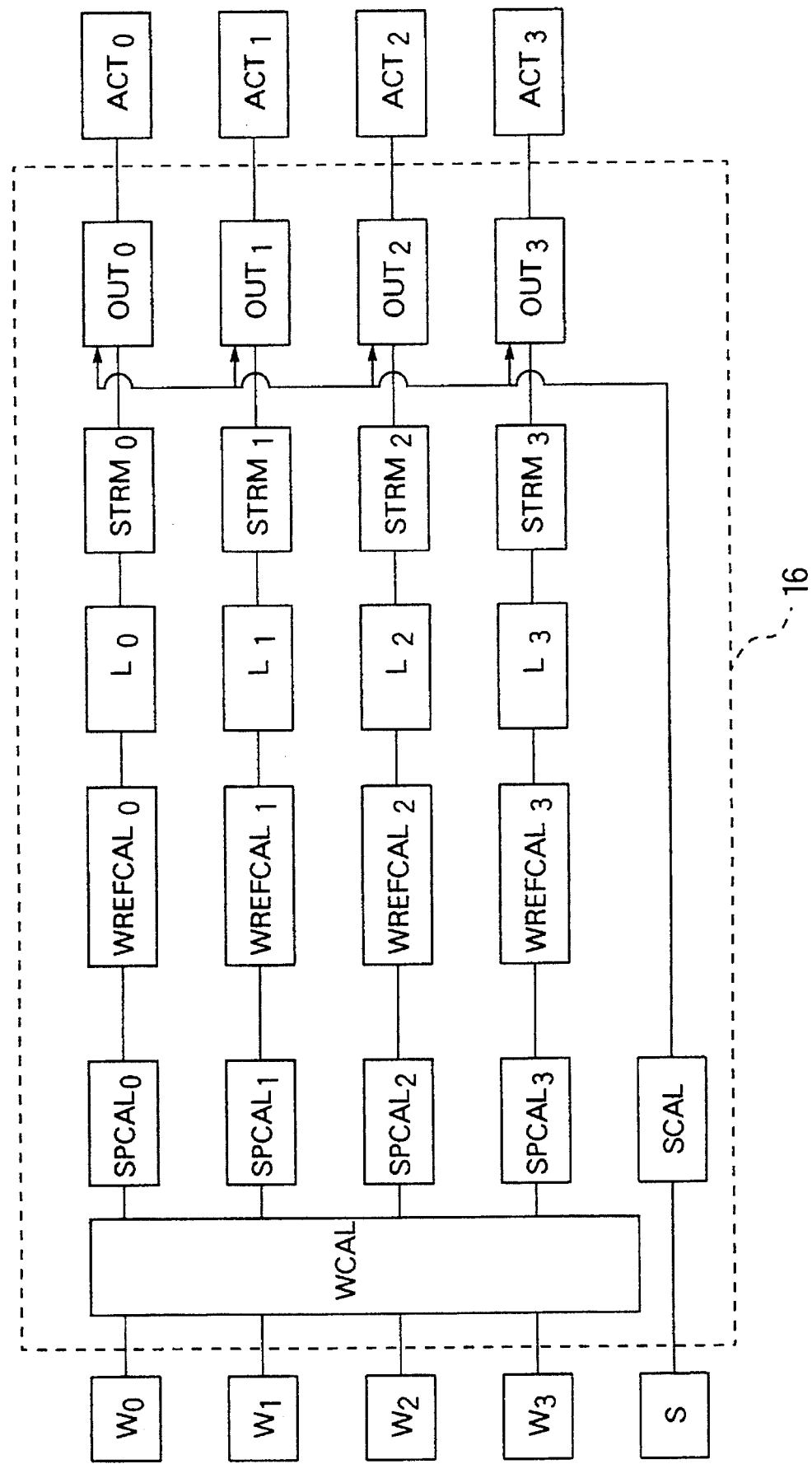
FIG. 25 is a schematic block diagram showing a seventh embodiment of the present invention.

A seventh embodiment of the present invention shown in FIG. 25 will be described hereinafter.

In the seventh embodiment as in the sixth embodiment, the pedal stroke quantity STR at each control cycle and the pedal stroke quantity $\text{STRE}_0$ through $\text{STRE}_3$ at the lock symptom detecting edge stored in the pedal stroke quantity storing means $\text{STRM}_0$ through $\text{STR}_3$ at the lock symptom detection edge are input into the pressure regulating signal setting means $\text{OUT}_0$ through $\text{OUT}_3$. The seventh embodiment is provided with split index calculating means $\text{SPCAL}_0$ through $\text{SPCAL}_3$, as in the second embodiment, to constitute the split controlling operation.

Figure 26:
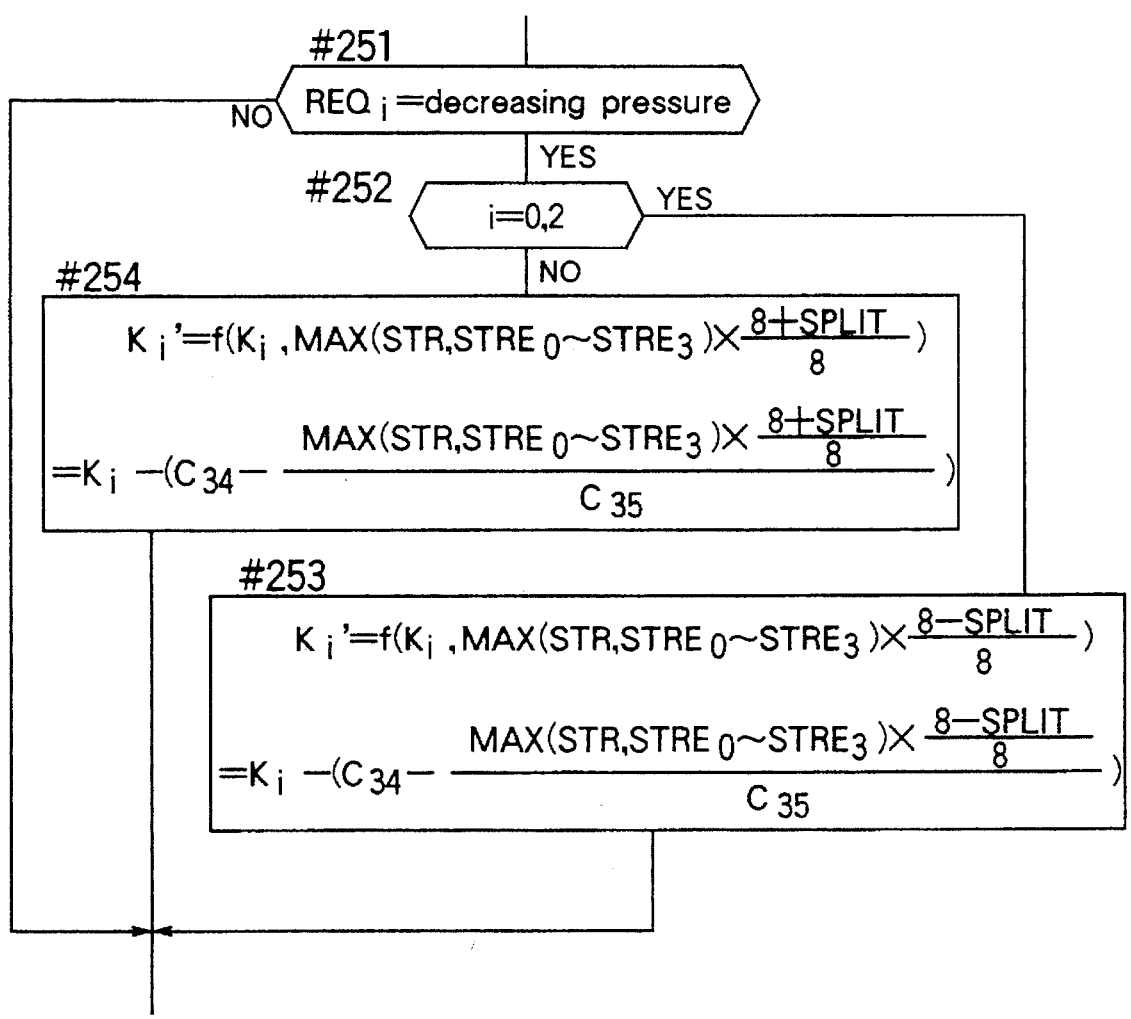
FIG. 26 is a partial view of a flow chart showing the seventh embodiment.

In the seventh embodiment, an operation similar to that of the second embodiment shown in FIG. 11 is effected. FIG. 4, which indicates the setting of the estimated vehicle body speed $\text{WREF}_i$, differs is different from the first embodiment in that step #42 is replaced by a step #191 shown in FIG. 20(A). In addition, a processing operation shown in FIG. 26 is inserted into a portion S6 in FIG. 7, showing the setting operation of the regulating pressure signal $K_i$.

In the seventh embodiment, a split index calculating means $\text{SPCAL}_0$ through $\text{SPCAL}_3$ calculates a split index SPLIT as shown in FIG. 12 at the step #7 in FIG. 11.

At the step #5 in FIG. 11, a pressure regulating signal $K_i$ is set. At this time, as shown in FIG. 7, the pressure regulating signal $K_i$ is set by a processing operation, shown at step #81 through the step #85. Thereafter, the step moves to a step #251 in FIG. 26. At the step #251, the control request $\text{REQ}_i$ is checked. In a case of "pressure reduction", the step moves to a step #252.

At the step #252, it is checked whether or not i= 0 or 2. If i=0 2 when the pressure reduction signal $K_i$ is corrected in accordance with the following equation (18) at the step #253 in the case of the left front wheel or the left rear wheel.

$$K'_i = f(K_i, \text{MAX} (STR, STRE_0 \text{ through } STRE_3) \times \quad (18)$$

$$(8 - SPLIT)/8) = K_i - [C_{34} -$$

$$\{\text{MAX} (STR, STRE_0 \text{ through } STRE_3) \times (8 - SPLIT)/8\}/C_{35}]$$

At a step #252, if i≠0, 2 a pressure regulating signal $K_i$ is corrected in accordance with the following equation (19) at the step # 254 in the case of a right front wheel or a right rear wheel.

$$K'_i = f(K_i, \text{MAX} (STR, STRE_0 \text{ through } STRE_3) \times \quad (19)$$

$$(8 + SPLIT)/8) = K_i - [C_{34} -$$

$$\{\text{MAX} (STR, STRE_0 \text{ through } STRE_3) \times (8 + SPLIT)/8\}/C_{35}]$$

Figure 27:
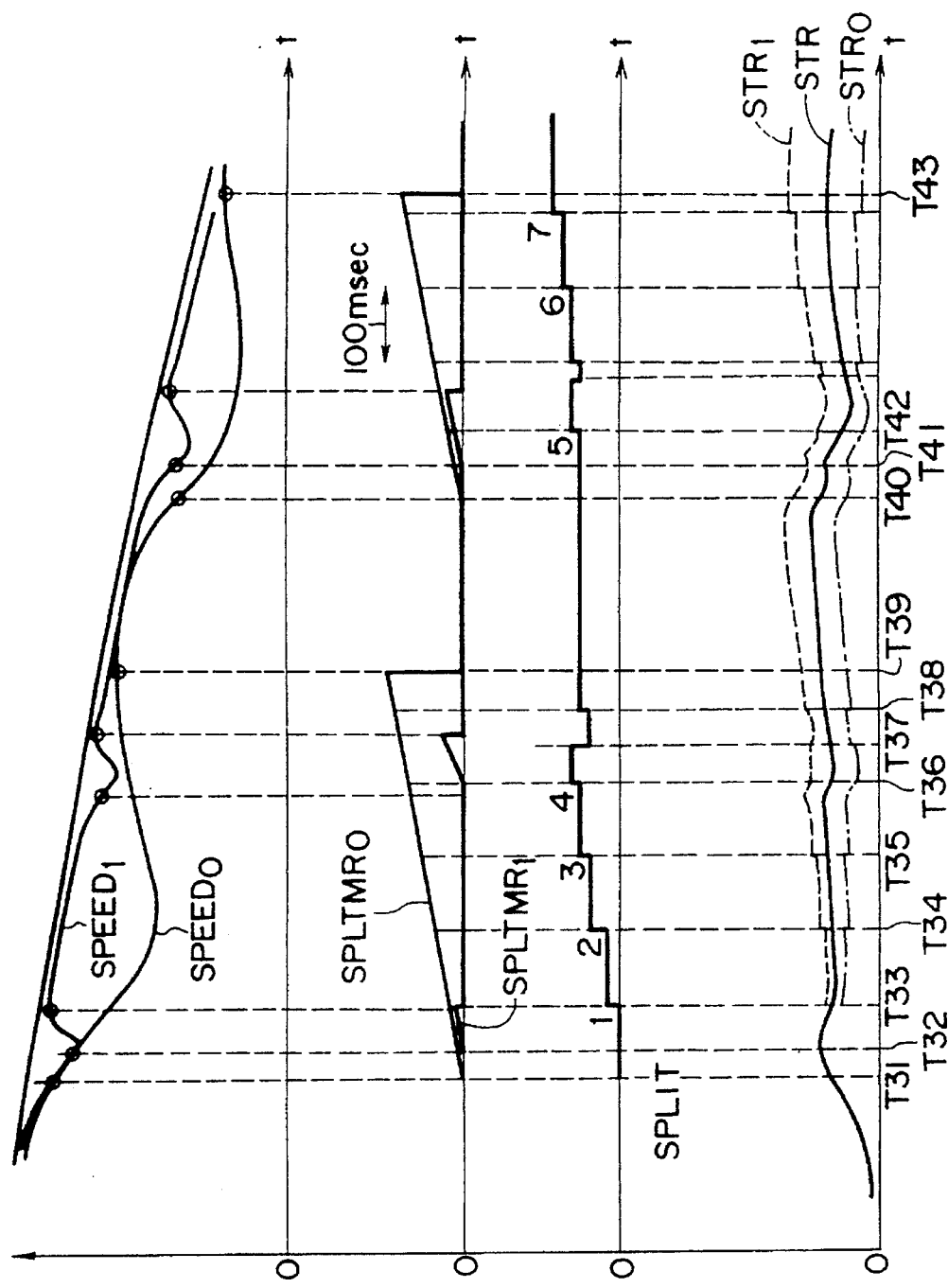
FIG. 27 is a block diagram showing one example of an operation of the seventh embodiment.
Figure 28:
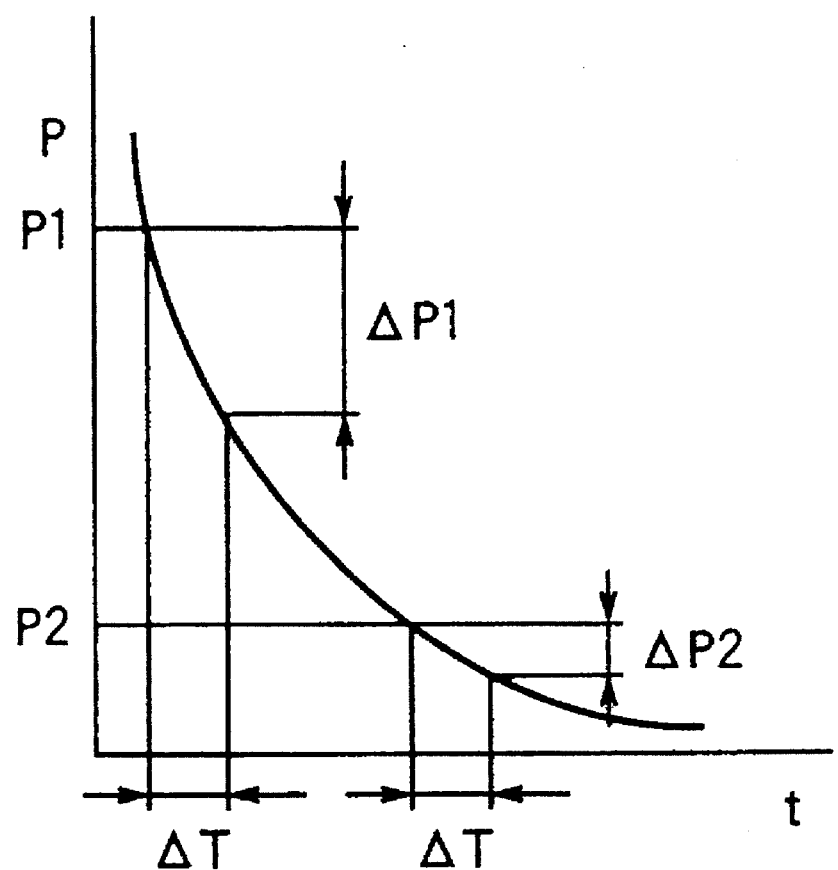
FIG. 28 is a block diagram showing the pressure reducing characteristic of a solenoid valve.

FIG. 27 shows one example of a concrete operation of a seventh embodiment.

FIG. 27 indicates a case where a vehicle is running on a split road surface where the left side of the vehicle is a low $\mu$ road surface, and a right side is a high $\mu$ road surface.

The lock symptom of the left front wheel (i=0) is detected for a period of time from a time T31 to a time T 39. During this period, "1" is added for each control cycle to a split timer $\text{SPLTMR}_0$. The lock symptom is detected to a time T32 about the above described time right front wheel (i= 1) so as to add 1 to the split timer $\text{SPLTMR}_i$. The lock symptom is released at a time T33 so as to clear to "0".

When the split timer $\text{SPLTMR}_0$, $\text{SPLTMR}_1$ of the left, right front wheels are changed as described hereinabove, "+ 1" is added to the split index SPLIT for each twelfth time of the control cycle as shown at times T33, T34, T35, T 36. At a time T37, "–1" is added so that the split index SPLIT moves closer to 0 by the processing operation of the #125, #126.

When the lock symptom at a left front wheel is cleared at a time T39, the split timer $\text{SPLTMR}_0$ is cleared to "0".

As the lock symptom is not detected at both a left front wheel and a right front wheel for a period of time from a time T39 to a time T40, the split timers $\text{SPLTMR}_0$, $\text{SPLTMR}_1$ are retained at 0. As the lock symptom of the left front wheel and the lock symptom of the right front wheel are respectively detected at a time T40 and at a time T41, split timers TIMERS $\text{SPLTMR}_0$, $\text{SPLTMR}_1$ and a split index SPLIT are operated as from the above described time T31 to a time T43.

In FIG. 27, the pedal stroke quantity STR at each control cycle changes as shown with a solid line, while a pedal stroke quantities $\text{STR}_0$, $\text{STR}_1$ (20) with respect to the left front wheel and the right front wheel corrected by the split index SPLIT are respectively changed as shown with one, dot chain line.

$$STR_i = \text{MAX}(STR, STRE_0 \sim STRE_3) \times \frac{8 - SPLIT}{8} \quad (i = 0.2) \quad (20)$$

$$= \text{MAX}(STR, STRE_0 \sim STRE_3) \times \frac{8 + STLIT}{8} \quad (i = 0.3)$$

Namely, the greater the split index becomes, and the greater the difference in frictional coefficient between the right and left road surfaces, the greater the pedal stroke quantity $\text{STR}_1$ of the right front wheel (i=1), which is on a high $\mu$ side becomes and the smaller the pedal stroke quantity of the left front wheel (i=0), which is a low $\mu$ side becomes, so that difference between them is set to become larger. The pressure increasing, reducing signal is set in accordance with these corrected pedal stroke quantities $\text{STR}_0$, $\text{STR}_1$ and the outlet•valves 4A through 4D can be opened and closed at a proper time in accordance with the road surface friction coefficient even on the split road surface, so that a preferable anti-lock controlling operation can be effected.

In the seventh embodiment as described hereinabove, the pressure regulating signal $K_i$ is corrected in accordance with a larger one of the pedal stroke quantity STR at each control cycle and the pedal stroke quantities $\text{STRE}_0$ through $\text{STRE}_3$ at the lock symptom detection edge so that the pressure regulating signal $K_i$ can be set properly in accordance with the road surface friction coefficient. As the split control is effected, a preferable controlling operation can be effected even in a case where a road surface μ becomes greater right, left of the vehicle.

The present invention is not restricted to the above described embodiments, and can be variably modified. For example, inlet•valves 3A through 3B in FIG. 1 can be made a so-called three-position controlling operation as an on/off type of solenoid•valves.

As is clear from the foregoing description, according to the arrangement of the present invention, in an anti-lock brake controlling apparatus in accordance with the present invention, a signal from the pedal stroke quantity detecting means for detecting the stepping quantity of the brake pedal is input. Considering the correspondence between the stepping quantity of the brake pedal and the road surface friction coefficient, it sets the signal for driving the fluid pressure control valve so that preferable anti-lock controlling operation can be effected in accordance with the road surface friction coefficient.

When an estimated vehicle body speed is calculated in accordance with the stepping quantity of the brake pedal detected by the above described pedal stroke quantity detecting means, in addition to wheel movements, the vehicle body speed can be estimated with high accuracy with sufficient consideration of road surface friction coefficients.

Even when the maximum descent speed of the estimated vehicle body speed is set larger than at a uniform road surface time on the higher friction coefficient's surface, the vehicle body speed at a high accuracy can be estimated and a high stopping efficiency can be obtained.

Similarly, when the estimated vehicle body speed corresponding to a wheel positioned on the external side of the turning radius is set larger than at a straight line during the turning operation of the vehicle, the vehicle body speed can be estimated at high accuracy and a high stopping efficiency can be obtained.

When the bottom value of the estimated vehicle body speed is regulated at a value where the deviation quantity has been reduced from the maximum value of the estimated vehicle body speed at each wheel position, and the deviation quantity is increased in accordance with increase of the stepping quantity of the brake pedal, the dispersion of the estimated vehicle body speed can be reduced in accordance with the road surface friction coefficient.

When the detecting sensitivity of the lock symptom is set with sensitivity as the stepping quantity of the brake pedal is smaller, the lock symptom on the low friction coefficient road surface can be quickly detected, because the detecting sensitivity of the lock symptom is set with sensitivity as the road surface of the road surface friction coefficient is lower.

When the pressure regulating signal which is an instruction of opening or closing with respect to the solenoid valve is corrected in accordance with the stepping quantity of the above described brake pedal with a control valve as a solenoid valve, excessive pressure reduction is prevented on the high friction coefficient road surface and also, the insufficient pressure reaction on the low friction coefficient road surface can be removed and the adjustment of the proper wheel cylinder fluid pressure can be effected in accordance with the road surface condition.

In a case of the split road surface in this case, the proper pressure increasing, reducing signal can be outputted with respect to the solenoid valve even on the split road surface by the correction of the stepping quantity of the brake pedal so as to properly control the wheel cylinder fluid pressure.

Although the present invention has been fully described by way of example with reference to the accompanying drawings, it is to be noted here that various changes and modifications will be apparent to those skilled in the art. Therefore, unless otherwise, such changes and modifications depart from the scope of the present invention, they should be constructed as included therein.

What is claimed is:

1. An anti-lock brake controlling apparatus including a master cylinder for feeding an operation fluid to a wheel cylinder side in accordance with a stepping quantity of a brake pedal, and a fluid pressure controlling valve for controlling a fluid pressure of said wheel cylinder, said apparatus further comprising:

pedal stroke quantity detecting means for detecting said stepping quantity of the brake pedal;

said pedal stroke quantity detecting means including means for detecting a friction coefficient of a road surface;

means for providing a signal for controlling said fluid pressure controlling valve responsive to, at least, said friction coefficient of said road surface detected by said pedal stroke quantity detecting means;

wheel speed detecting means for detecting a speed of each wheel of a vehicle;

wheel movements calculating means for calculating wheel movements, including at least a wheel speed responsive to said wheel speed detecting means; and vehicle body speed estimation calculating means for calculating an estimated vehicle body speed in a position of each wheel responsive to said wheel movements calculating means and a stepping quantity of the brake pedal detected by said pedal stroke quantity detecting means.

2. An anti-lock brake controlling apparatus according to claim 1, wherein said vehicle body speed estimation calculating means increases a maximum descent speed of said estimated vehicle body speed responsive to an increase in said stepping quantity detected by said pedal stroke quantity detecting means.

3. An anti-lock brake controlling apparatus according to claim 1, wherein:

said vehicle body estimation calculating means increases a maximum descent speed of said estimated vehicle body speed corresponding to a wheel positioned on the road surface having a larger road surface friction coefficient, in accordance with the increase in the stepping quantity detected by said pedal stroke quantity detecting means when a difference in the friction coefficients of the road surface where the vehicle is running between the right-hand side and the left-hand side of the vehicle is large, and to set it to a value greater than the maximum descent speed when a road surface is uniform.

4. An anti-lock brake controlling apparatus according to claim 1, wherein said vehicle body speed estimation calculating means increases, in accordance with an increase in the stepping quantity detected by said pedal stroke quantity detecting means, the maximum descent speed of said estimated vehicle body speed corresponding to a wheel positioned on an external side of a turning radium when the vehicle is turning, and sets it to a value greater than said maximum descent speed when the vehicle is operated along a straight line.

5. An anti-lock brake controlling apparatus according to claim 1, wherein said vehicle body speed estimation calculating means increases a maximum descent speed of said estimated vehicle body speed responsive to an increase in the greater of the stepping quantity of each control cycle detected by said pedal stroke quantity detecting means and the stepping quantity at a starting time of a skid cycle.

6. An anti-lock brake controlling apparatus according to claim 1, wherein said vehicle body speed estimation calculating means regulates a low value of said estimated vehicle body speed with a value reduced by a predetermined deviation quantity with respect to a maximum value of the estimated vehicle body speed of each wheel to increase said deviation quantity responsive to an increase in a greater of the stepping quantity of each control cycle and the stepping quantity at a starting time of a skid cycle.

7. An anti-lock brake controlling apparatus according to claim 1, further comprising lock symptom detecting means for detecting a lock symptom responsive to said wheel movements calculated by said wheel movements calculating means and the stepping quantity detected by said pedal stroke quantity detecting means.

8. An anti-lock brake controlling apparatus according to claim 7, wherein said lock symptom detecting means determines a detection sensitivity of lock symptoms as the stepping quantity detected by said pedal stroke quantity detecting means decreases.

9. An anti-lock brake controlling apparatus according to claim 7, wherein said lock symptom detecting means determines a detection sensitivity of lock symptoms as a greater of the stepping quantity of the brake pedal at each control cycle detected by said pedal stroke quantity detecting means and the stepping quantity of the brake pedal at a start of a skid cycle.

10. An anti-lock brake controlling apparatus comprising:
    a fluid pressure control valve comprising a solenoid valve;
    a wheel cylinder having a fluid pressure adjustable by a switching operation of said solenoid valve;
    wheel speed detecting means for detecting a speed of each wheel of a vehicle;
    wheel movements calculating means for calculating a vehicle movement, including at least a wheel speed, responsive to said wheel speed detecting means; and
    pressure regulating signal means for setting a pressure regulating signal, for instructing a switching operation with respect to said solenoid valve, said pressure regulating signal means setting said pressure regulating signal to adjust the fluid pressure of said wheel cylinder responsive to said wheel movements calculating means, and a larger of a stepping quantity of a brake pedal detected by a pedal stroke quantity detecting means and a stepping quantity of said brake pedal stored in a memory during a skid cycle.

11. An anti-lock brake controlling apparatus according to claim 10, wherein said pressure regulating signal setting means adjusts, in accordance with said stepping quantity of said brake pedal detected by said pedal stroke quantity detecting means, said pressure regulating signal to change the fluid pressure of said wheel cylinder set in accordance with wheel movements calculated by said wheel movements calculating means.

12. An anti-lock brake controlling apparatus according to claim 10, wherein said pressure regulating signal setting means adjusts, in accordance with a greater of said stepping quantity of said brake pedal at each control cycle detected by said pedal stroke quantity detecting means and said stepping quantity at said skid cycle, said pressure regulating signal to change the fluid pressure of said wheel cylinder in accordance with wheel movements calculated by said wheel movements calculating means.

13. An anti-lock brake controlling apparatus according to claim 10, wherein said pressure regulating signal setting means adjusts, in accordance with a difference between right and left road surface friction coefficients, said pressure regulating signals set in accordance with wheel movements calculated by said wheel movements calculating means and said stepping quantity of said brake pedal detected by said pedal stroke detecting means when a road surface friction coefficient is different for right and left sides of said vehicle.

14. An anti-lock brake control system for a vehicle, comprising:
    a brake detector for monitoring a degree of depression of a brake pedal;
    a wheel speed detector for monitoring a rotational speed of a wheel;
    means for determining a maximum permissible reduction in said rotational speed of said wheel during an anti-lock brake control operation, based on a larger of said degree of depression of said brake pedal and a previous degree of depression during a skid cycle, stored in a memory; and
    means, responsive to said maximum permissible reduction in said rotational speed determined by said determining means, for changing a brake pressure applied to said wheel.

15. The anti-lock control system according to claim 14, wherein determining means controls said maximum permissible reduction in said rotational speed to not exceed a predetermined value, in accordance with braking characteristics of the vehicle.

16. The anti-lock control system according to claim 14, further comprising:
    means, responsive to said means for determining, for detecting if said rotational speed of a present cycle is within a total of said maximum permissible reduction and a prior reference wheel speed; and
    means, responsive said means for detecting, for setting a present reference wheel speed at said rotational speed when said means for detecting is positive, and at said total when said means for detecting is negative.

17. An anti-lock brake control system for a vehicle, comprising:
    a brake detector effective to monitor a degree of depression of a brake pedal;
    at least first and second wheel speed detectors effective to monitor a speed of rotation of at least first and second wheels;
    at least first and second memories corresponding to said at least first and second wheels;
    means for determining a maximum permissible reduction in said speed of rotation of said wheels based on a larger of said degree of depression of said brake pedal for a present operational cycle and a previous degree of depression stored in said at least first and second memories;
    means for detecting a lock symptom in at least one of said at least first and second wheels;
    means, responsive to said means for detecting, for storing said degree of depression of said brake pedal in said at least first and second memories; and
    means, responsive to said means for detecting, for changing a brake pressure applied to said wheel.

* * * * *